(12) United States Patent
Teraoka et al.

(10) Patent No.: US 8,365,993 B2
(45) Date of Patent: Feb. 5, 2013

(54) SELF SCANNING SYSTEM

(75) Inventors: Kazuharu Teraoka, Tokyo (JP); Tetsuo Ono, Tokyo (JP); Ryouichi Katata, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 662 days.

(21) Appl. No.: 11/945,954

(22) Filed: Nov. 27, 2007

(65) Prior Publication Data
US 2008/0128497 A1    Jun. 5, 2008

(30) Foreign Application Priority Data

Nov. 30, 2006 (JP) ................................. 2006-324010
May 23, 2007 (JP) ................................. 2007-136582
May 23, 2007 (JP) ................................. 2007-136583

(51) Int. Cl.
*G06K 15/00* (2006.01)
(52) U.S. Cl. .............. 235/383; 705/17; 705/20; 705/21; 705/23
(58) Field of Classification Search .................... 235/383
See application file for complete search history.

(56) References Cited

U.S. PATENT DOCUMENTS

| | | | |
|---|---|---|---|
| 6,240,426 B1 | 5/2001 | Beyda et al. | |
| 6,385,541 B1 * | 5/2002 | Blumberg et al. | 701/213 |
| 2001/0032130 A1 | 10/2001 | Gabos et al. | |
| 2002/0178088 A1 | 11/2002 | Lurie et al. | |
| 2003/0195818 A1 * | 10/2003 | Howell et al. | 705/26 |
| 2005/0160014 A1 * | 7/2005 | Moss et al. | 705/26 |
| 2007/0080230 A1 * | 4/2007 | Garver | 235/462.46 |
| 2007/0284440 A1 * | 12/2007 | Birmingham et al. | 235/383 |

FOREIGN PATENT DOCUMENTS

| | | |
|---|---|---|
| JP | S58-171567 | 11/1983 |
| JP | 61-292109 | 12/1986 |
| JP | 62-78721 | 3/1987 |
| JP | 05-282549 | 10/1993 |
| JP | 07-065239 | 3/1995 |
| JP | 09-128648 | 5/1997 |

(Continued)

OTHER PUBLICATIONS

Symbol—Motorola: "Product Reference Guide PS3050," 2004, XP002475450.

(Continued)

*Primary Examiner* — Thien M Le
*Assistant Examiner* — Tae Kim
(74) *Attorney, Agent, or Firm* — K&L Gates LLP

(57) ABSTRACT

A product sales processing system includes a portable terminal; a cash register, a customer operating the portable terminal so that product codes are read and stored in the portable terminal, and payment is made at the cash register based on the stored data; and an intermediating device that connects the portable terminal to the cash register such that the portable terminal and the cash register can communicate with each other, the portable terminal comprising: a code reading section that reads the codes that are provided to products; a storage section that stores the codes which have been read by the code reading section; and a communication section that, when the portable terminal is connected to the intermediating device, transmits product purchase information which includes the codes stored in the storage section to the cash register via the intermediating device.

4 Claims, 15 Drawing Sheets

FOREIGN PATENT DOCUMENTS

| | | | |
|---|---|---|---|
| JP | 10111985 A | * | 4/1998 |
| JP | 10-241050 | | 9/1998 |
| JP | 11-353554 | | 12/1999 |
| JP | 2003-067834 | | 3/2003 |
| JP | 2006-227986 | | 8/2006 |
| WO | 02/13100 | | 2/2002 |

OTHER PUBLICATIONS

EP Examination Report for corresponding 07121422.5 dated Feb. 1, 2011; 6 pages.

Japanese Patent Office, Notice of Reasons for Rejection, issued in connection with Japanese Patent Application No. 2006-324010, mailed Apr. 3, 2012. (4 pages).

Japanese Patent Office, Notice of Reasons for Rejection, issued in connection with Japanese Patent Application No. 2007-136582, mailed Jun. 19, 2012. (4 pages).

Japanese Patent Office, Notice of Allowance issued in connection with Japanese Patent Application No. 2007-136583, mailed Jul. 3, 2012. (6 pages).

* cited by examiner

FIG. 7

| JAN CODE | PRODUCT NAME | PRICE (YEN) | NORMAL SELLING PRICE | BARGAIN SALE CLASSIFICATION | FOCUSED PRODUCT CLASSIFICATION | ... |
|---|---|---|---|---|---|---|
| AAA | GRILLED MEAT BOX LUNCH | 550 | 650 | 1 | A | ... |
| BBB | CHOCOLATE | 105 | 105 | 0 | B | ... |
| CCC | TOILET PAPER | 185 | 298 | 2 | C | ... |
| DDD | FRIED CHICKEN BOX LUNCH | 450 | 550 | 1 | A | ... |
| ... | ... | ... | ... | ... | ... | ... |

FIG. 8

| BARGAIN SALE CLASSIFICATION | CLASSIFIED AS |
|---|---|
| 0 | NORMAL PRICE SALE |
| 1 | SPECIAL PRICE SALE |
| 2 | LIMITED TIME SALE |

FIG. 9

| FOCUSED PRODUCT CLASSIFICATION | CLASSIFIED AS |
|---|---|
| A | MAXIMUM IMPORTANCE |
| B | HIGH IMPORTANCE |
| C | INTERMEDIATE IMPORTANCE |
| D | NORMAL IMPORTANCE |

FIG. 11

| JAN CODE | PRODUCT NAME | PRICE (YEN) | DATA CLASSIFICATION | NUMBER | BARGAIN SALE CLASSIFICATION | FOCUSED PRODUCT CLASSIFICATION | DATE | ... |
|---|---|---|---|---|---|---|---|---|
| AAA | GRILLED MEAT BOX LUNCH | 550 | 0 | 1 | 1 | A | 20070424102005 | ... |
| DDD | FRIED CHICKEN BOX LUNCH | 450 | 0 | 1 | 0 | B | 20070424102005 | ... |
| CCC | TOILET PAPER | 185 | 0 | 1 | 2 | C | 20070424102005 | ... |
| BBB | CHOCOLATE | 105 | 1 | 1 | 1 | A | 20070424102005 | ... |
| DDD | FRIED CHICKEN BOX LUNCH | -450 | | | | A | 20070424102005 | ... |
| ... | ... | ... | ... | ... | ... | ... | ... | ... |

| A | B | C | D |
|---|---|---|---|
| 1000 YEN OR MORE | 500 YEN OR MORE | 300 YEN OR MORE | 100 YEN OR MORE |

FIG. 16

| 1000 YEN OR MORE | 500 YEN OR MORE | 300 YEN OR MORE | 100 YEN OR MORE |
|---|---|---|---|
|  |  | 3 | 1 |

FIG. 18

TOTAL 4 ITEMS 1025YEN

EGG          125YEN
1    ······   125YEN
APPLE        300YEN
3    ······   900YEN

| 1000 YEN OR MORE | 500 YEN OR MORE | 300 YEN OR MORE | 100 YEN OR MORE |
|---|---|---|---|
|  |  | 3 | 1 |

PRICE ZONE DISPLAY AREA

SELF SCANNING SYSTEM

CROSS REFERENCES TO RELATED APPLICATIONS

The present application claims priority to Japanese Patent Application No. 2006-324010, filed Nov. 30, 2006, and Japanese Patent Application Nos. 2007-136582 and 2007-136583, filed May 23, 2007, the contents of which are incorporated herein by reference.

BACKGROUND

The present disclosure relates to a product sales processing system, and particularly to a product sales processing system that allows a customer in a store to read a product code using a predetermined terminal and make payment using that terminal.

In retail outlets such as supermarkets and the like, apparatuses (known as cash registers) such as POS (point of sale) cash registers are used for the registering and payment of products purchased by customers. POS cash registers are normally operated by a store clerk, and the store clerk reads a barcode provided to a product using a barcode scanner which is connected to (or incorporated in) the POS cash register, and is thus able to perform the tasks of registering and payment.

Moreover, in recent years, product sales processing systems known as self scanning systems have been proposed (see, for example, Japanese Unexamined Patent Application, First Publication (JP-A) No. 63-245594). These systems have made it possible, as a result of customers who are visiting a store being able to read barcodes themselves, to avoid the crowds that are generated when a large number of customers are queuing in front of a cash register during store busy periods, and thereby alleviate the work load on store clerks.

According to JP-A No. 63-245594, the system is formed by a product sales data processing apparatus main unit which corresponds to a POS cash register, and by a portable terminal device which is a device used by a customer in a store to read a bar code in place of the bar code scanner used by a store clerk. This portable terminal device is able to be removably attached to the product sales data processing apparatus main unit, and is passed to a customer when they enter the store. Using this portable terminal device, for example, a customer takes down an item they wish to buy from a product display shelf and reads the barcode thereof. The data from the read barcode is stored in the memory inside the portable terminal device. The customer then takes the portable terminal device to the product sales data processing apparatus main unit (i.e., the cash register), and the portable terminal device is connected to the cash register. When the portable terminal device is connected to the cash register, the data of the purchased product which is stored in memory is transferred from the portable terminal device to the product sales data processing apparatus main unit. Consequently, processing such as the registering of the product, payment, and receipt issuance and the like are performed in the product sales data processing apparatus main unit.

However, cash registers of systems in which a store clerk operates the cash register which have already been introduced into retail outlets and are currently in use are not normally designed so as to be connection compatible with the above described type of portable terminal device. As a result, in the above described conventional self scanning systems, both the product sales data processing apparatus main body and the portable terminal devices have had to be made specifically for a self scanning systems. Because of this, in order to introduce a self scanning system, a retail outlet side has had to totally replace the entire system, even going as far as having to replace the cash registers that they had been using in their established system with cash registers (i.e., product sales data processing apparatus main units) of the new self scanning system. Because of such necessities, the problem has existed that introducing a self scanning system has proved extremely costly.

Furthermore, in the method according JP-A No. 63-245594, a customer reads barcodes of the products they want to buy. Consequently, it is necessary for a store clerk to check whether or not the product sales data generated based on the barcodes read by the customer matches up with the actually purchased products. As a method for this check, the clerk compares a list of the product sales data displayed on a display apparatus such as a display section with the purchased products to determine whether or not the two match up. Alternatively, instead of checking whether or not all the purchased products match up with the sales product data, the store clerk makes a check only of a part of the purchased products, namely, important products such as expensive products in order to reduce labor and time for the check. However, this poses a problem that it is hard to find important products from a list of the product sales data because the product sales data is displayed in the order in which the customer read the barcodes of the products.

Furthermore, in a method of checking whether or not the number of the purchased products included in the product sales data matches up with that of the actually purchased products when a store clerk checks whether or not the product sales data is not different from the actually purchased products, the problem has existed that it is not possible to determine whether or not product(s) different in price are included even though the two numbers are the same, and hence it is not possible to check a difference in price. For example, even if the number of the purchased products included in the product sales data matches up with that of the purchased products in the shopping basket, wrong amount of money will be charged at the time of payment when the product(s) in the shopping basket are different from the product(s) represented by the product sales data.

SUMMARY

In view of the above described circumstances, embodiments of the present disclosure provide a product sales processing system (i.e., a self scanning system) in which it is possible to construct a low cost system in which existing cash registers are able to be used.

In an embodiment, a product sales processing system (i.e., a self scanning system) is provided in which it is possible for a store clerk to easily check important products when checking whether or not the product sales data read by a customer in a store matches up which the actually purchased products.

In an embodiment, a product sales processing system (i.e., a self scanning system) is provided in which it is possible to easily check whether or not the product sales data read by a customer in a store matches up with the actually purchased products.

In an embodiment, a product sales processing system includes: a portable terminal; a cash register, a customer operating the portable terminal so that product codes are read and stored in the portable terminal, and payment is made at the cash register based on the stored data; and an intermediating device that connects the portable terminal to the cash register such that the portable terminal and the cash register can communicate with each other, the portable terminal comprising: a code reading section that reads the codes that are provided to products; a storage section that stores the codes which have been read by the code reading section; and a communication section that, when the portable terminal is connected to the intermediating device, transmits product purchase information which includes the codes stored in the storage section to the cash register via the intermediating device.

In an embodiment, the intermediating device may include a guide portion that guides a portable terminal to a predetermined placement position, and a connecting terminal of the intermediating device may be connected to the portable terminal that is placed in the placement position.

In an embodiment, the portable terminal includes a number input device that inputs the number of each product whose code has been read by the code reading section, and one of the portable terminal and the intermediating device includes a device that transmits the code of a product for which an input has been made via the number input device to the cash register the same number of times as the input was made.

In an embodiment, the communication section may transmit the product purchase information that is stored in the storage section in a descending order of prices, and the cash register includes: a receiving section that receives the product purchase information from the portable terminal; and a display section that displays the product purchase information in an order in which the product purchase information is received by the receiving section.

In an embodiment, product purchase information is sent to the cash register from the communication section, and the cash register includes: a communication device that receives the product purchase information including the codes from the portable terminal; a storage device that stores the product purchase information received by the communication device; and a display section that displays the product purchase information stored in the storage device in a descending order of prices.

In an embodiment, the storage device further stores previously-set product information which relates the codes with prices of the products, and previously-set price zone information, and the portable terminal further includes: a control section that determines the price zones to which the products provided with the codes which have been read by the code reading section based on the codes which have been read by the code reading section and stored in the storage section, on the product information, and on the price zone information, and that calculates numbers of the products which belong to the price zones for the individual price zones; a display section that displays the numbers which have been calculated by the control section for each price zone.

In an embodiment, because it is possible to use existing cash registers as the cash registers of a self scanning system, it is possible to construct a self scanning system at low cost.

Furthermore, in an embodiment, because a portable terminal is guided by guide portions to a predetermined placement position and is connected thereto via connection terminals, excellent operability is obtained.

Furthermore, in an embodiment, even when more than one of a single product is being purchased, data can be transmitted to a cash register from a portable terminal in a format that allows the data to be processed by existing cash registers.

According to an embodiment, in the case where the a product sales processing system (i.e., a self scanning system) is used, it is possible for a store clerk to easily check important products when checking whether or not the product sales data that a customer read matches up with the actually purchased products.

According to an embodiment, it becomes possible to check the number of the products read and registered by a customer against the number of actually purchased products for every price zone, which makes it easy to check for error not only in number but also in total price. Moreover, comparison in price-zone based display between the number of products in high price zones and that of actually purchased products eliminates the need to check all the purchased products and thereby enables an efficient check.

According to an embodiment, not only the price-zone based display but also information on the products whose codes are read is displayed on the display section, which makes it easy to find a product the store clerk wants to check because it is possible to see which product is allocated to which price zone.

According to an embodiment, a price zone to which a product whose code is not registered belongs is further provided in the price zone information. As a result, if product(s) whose price is not registered is included in the products read by a portable terminal, this fact is displayed, and thereby a store clerk is readily informed that they have to perform a payment operations respectively on those products. In addition, the number of them is displayed, which helps to see how many products whose price is not registered are included. Consequently, it is possible to prevent any products from being unpaid.

Additional features and advantages are described herein, and will be apparent from, the following Detailed Description and the figures.

BRIEF DESCRIPTION OF THE FIGURES

FIG. 7 shows an example of a product master file according to an embodiment.

FIG. 8 shows an example of bargain sale classification according to an embodiment.

FIG. 9 shows an example of focused product classification according to an embodiment.

FIG. 11 shows an example of a registered product master file according to an embodiment.

FIG. 14 shows a display example of product information displayed on a liquid crystal touch screen according to an embodiment.

FIG. 15 shows an example of a price zone file according to an embodiment.

FIG. 16 shows an example of how price zones are displayed according to an embodiment.

FIG. 18 shows an example of how price zones and product information are displayed according to an embodiment.

DETAILED DESCRIPTION

An embodiment will now be described with reference made to the drawings.

Figure 1:
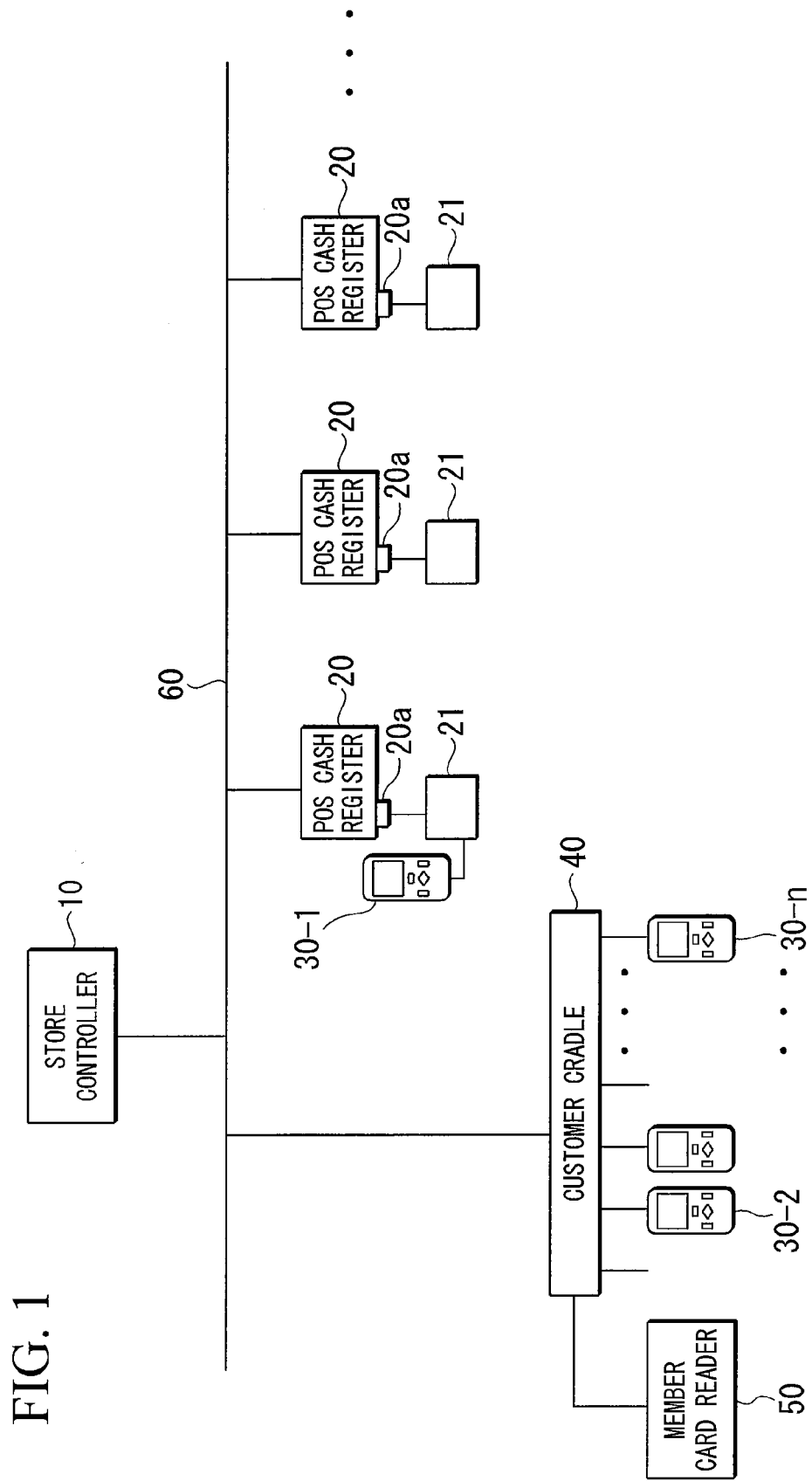
FIG. 1 is a system structure diagram of a product sales processing system according to an embodiment.

FIG. 1 is a diagram showing the system structure of a product sales processing system according to an embodiment. In this drawing, a store controller 10, a plurality of POS cash registers 20, n number of handy terminals 30-1 to 30-*n* (i.e., portable terminals) which a customer uses to read product codes, cash register cradles 21 (i.e., intermediating devices) that are connected by a cable to the respective POS cash register 20 and in which a handy terminal is set when products for purchase are being paid for, a customer cradle 40 in which handy terminals are placed when not in use, and a member card reader 50 are included in the product sales processing system. The respective POS cash registers 20 and the customer cradle 40 are connected to the store controller 10 by a local area network (LAN).

Here, the store controller 10 and the respective POS cash registers 20 are existing device types that have already been introduced into the retail outlet in which the product sales processing system is being constructed. The product sales processing system is created by the additional introduction of the cash register cradles 21, the handy terminals 30-1 to 30-*n*, the customer cradle 40, and the member card reader 50.

The store controller 10 is a computer which controls various files and data such as product master files, membership files, and sales record files. Here, the product master files are files which store product information such as the product name, the product code, and the sales price and the like of various products, and the contents thereof may be edited or modified when necessary. In addition, the most recent product master files are transmitted to the respective POS cash registers 20 and customer cradle 40 as is appropriate. The membership files store a list of customers who have registered as members with this retail outlet as well as the customer numbers and the like thereof.

The sales record files are files created by tabulating data obtained from the registering and payment processing in the respective POS cash registers 20.

FIG. 7 shows an example of a product master file. The product master file is expressed in a tabular form. Its attributes include JAN code (code), product name, price, normal selling price, bargain sale classification, and focused product classification. One row represents information of one product.

For example, the JAN code "AAA" has a grilled meat box lunch as its product name, 550 yen as its price, 650 yen as its normal selling price, "1" as its bargain sale classification, and "A" as its focused product classification. In addition, the bargain sale classification and the focused product classification have a subordinate table, respectively. FIG. 8 shows an example of a table of a bargain sale classification. Its attributes include bargain sale classification and "classified as." The bargain sale classification "0" is classified as normal price sale; the bargain sale classification "1" is classified as special price sale; and the bargain sale classification "2" is classified as limited time sale. FIG. 9 shows an example of a table of a focused product classification. Its attributes include focused product classification and "classified as." The focused product classification "A" is classified as maximum importance; the focused product classification "B" is classified as high importance; the focused product classification "C" is classified as intermediate importance; and the focused product classification "D" is classified as normal importance. Note that the contents of the product master file may be edited or modified when necessary. In addition, the most recent product master file is transmitted to the respective POS cash registers 20 and customer cradle 40 as is appropriate. The membership files store a list of customers who have registered as members with this retail outlet as well as the membership numbers and the like thereof. The sales record files are files created by tabulating data obtained from the registering and payment processing in the respective POS cash registers 20.

Figure 3:
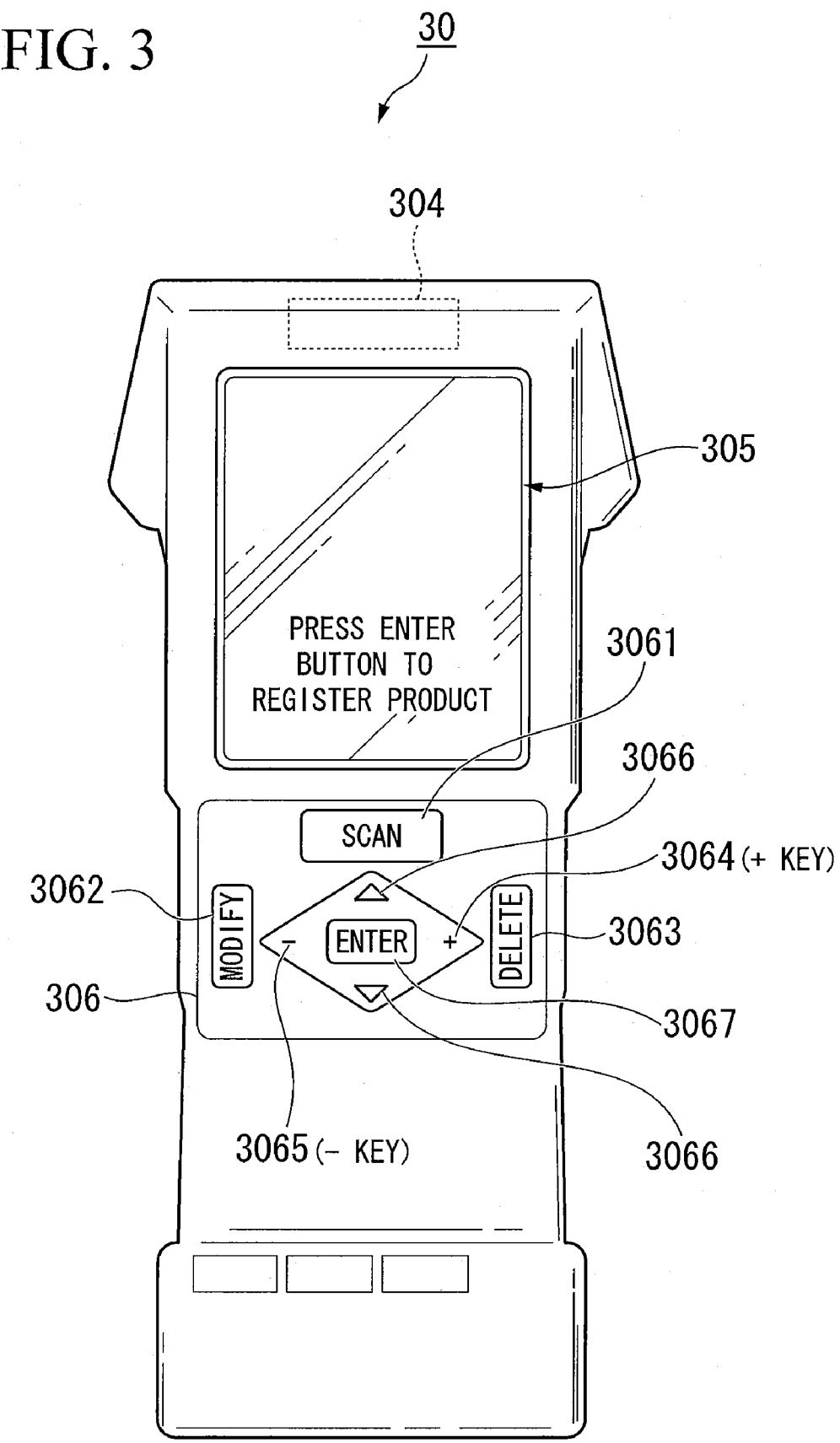
FIG. 3 is an exterior view of a front side of the handy terminal shown in FIG. 2.

Note that the product master files are files whose contents may be edited or modified when necessary. In addition, the most recent product master files are transmitted to the respective POS cash registers 20 and customer cradle 40 as is appropriate. FIG. 3 shows an example of a membership file. Each membership file (not shown) is expressed in a tabular form, and its attributes include membership number, name, address, and telephone number. The sales record files are files created by tabulating data obtained from the registering and payment processing in the respective POS cash registers 20. FIG. 15 shows an example of a price zone file. The example shown in the drawing has four price zones of A, B, C, and D. A is an area for 1000 yen or more; B for 500 yen or more (less than 1000 yen); C for 300 yen or more (less than 500 yen); and D for 100 yen or more (less than 300 yen).

The POS cash registers 20 are apparatuses which performed the registering and payment of products purchased by a customer, and are provided with a variety of operation keys and display units. These POS cash registers 20 were originally apparatuses to which barcode scanners (not shown) which read product barcodes when operated by a store clerk are connected by a predetermined cable, however, these barcode scanners are removed and after removal the cash register cradles 21 are connected to connectors 20*a*. The same communication standard, for example, an RS-232C interface, as was used for the removed barcode scanners is used for these connections. As a result, data communication is performed using the serial communication of the RS-232C between the POS cash registers 20 and the cash register cradles 21 and the handy terminals 30 (described below) that are placed in the cash register cradles 21. The terminals on the cash register side of the cash register cradle 21 are directly connected by signal wires to the terminals on the handy terminal side.

In a retail outlet in which this product sales processing system has been introduced, the customer cradle 40 and the member card reader 50 are located adjacent to the store entrance. A plurality of handy terminals 30 which are not in use are set in the customer cradle 40 awaiting use by a customer to the store. When a customer passes their member card through the member card reader 50, one of the handy terminals 30 is placed in a usable state. The customer then removes that handy terminal 30 from the customer cradle 40 and starts shopping. The customer then uses the handy terminal 30 to read the codes of products which the customer wishes to purchase, and when the customer has finished shopping the customer goes to a POS cash register 20 and sets the handy terminal 30 in the cash register cradle 21 (in FIG. 1, the handy terminal 30-1 is set in a cash register cradle 21).

Consequently, product purchase information such as the codes of the products which have been read is transmitted from the handy terminal 30 to the POS cash register 20 via the cash register cradle 21. In accordance with the product purchase information obtained in this manner, the POS cash register 20 executes product registering by referring to product master files (i.e., product master files received from the store controller 10 as is described above) held in memory (not shown). As a result, the total cost of the purchased products is calculated in the POS cash register 20, and the calculated total cost and the like are displayed on the display section of the POS cash register 20. A store clerk then performs payment processing by performing a payment operation, and the sales record files are then updated and a receipt is issued.

Note that the customer cradle 40 is provided with a CPU and memory (not shown), and has a communication function to enable it to communicate with handy terminals 30 which have been set in position, the member card reader 50, and the store controller 10. Product master files transmitted from the store controller 10 are stored in the memory, and when a handy terminal 30 is set in position, the product master file within the handy terminal 30 is updated. Moreover, the sequence in which a plurality of handy terminals 30 are set in position is controlled, and the membership number data is transmitted from the member card reader 50 to the handy terminal 30 which was set first from among the set handy terminals 30.

Figure 2:
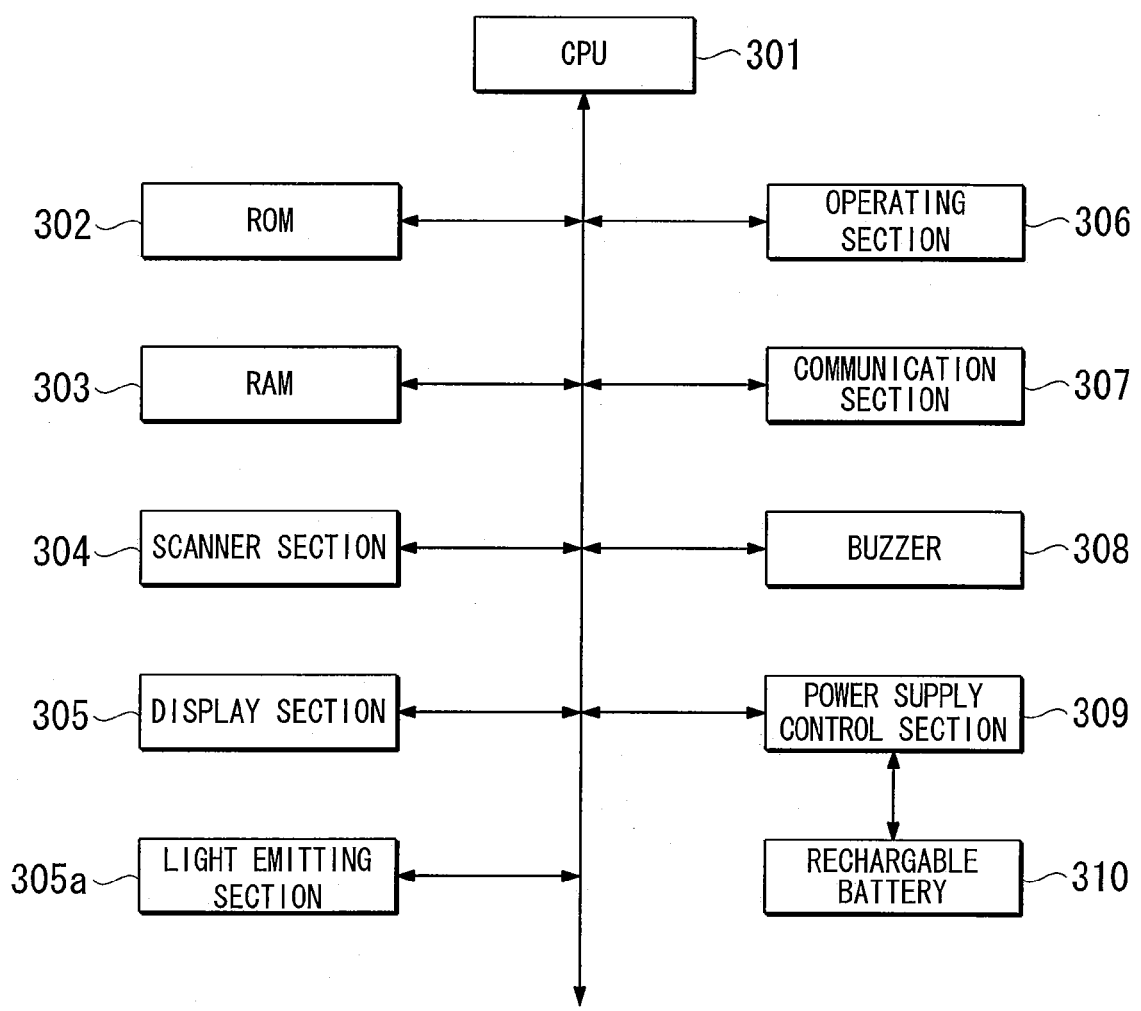
FIG. 2 is a block diagram showing the structure of a handy terminal in the product sales processing system shown in FIG. 1.
Figure 4:
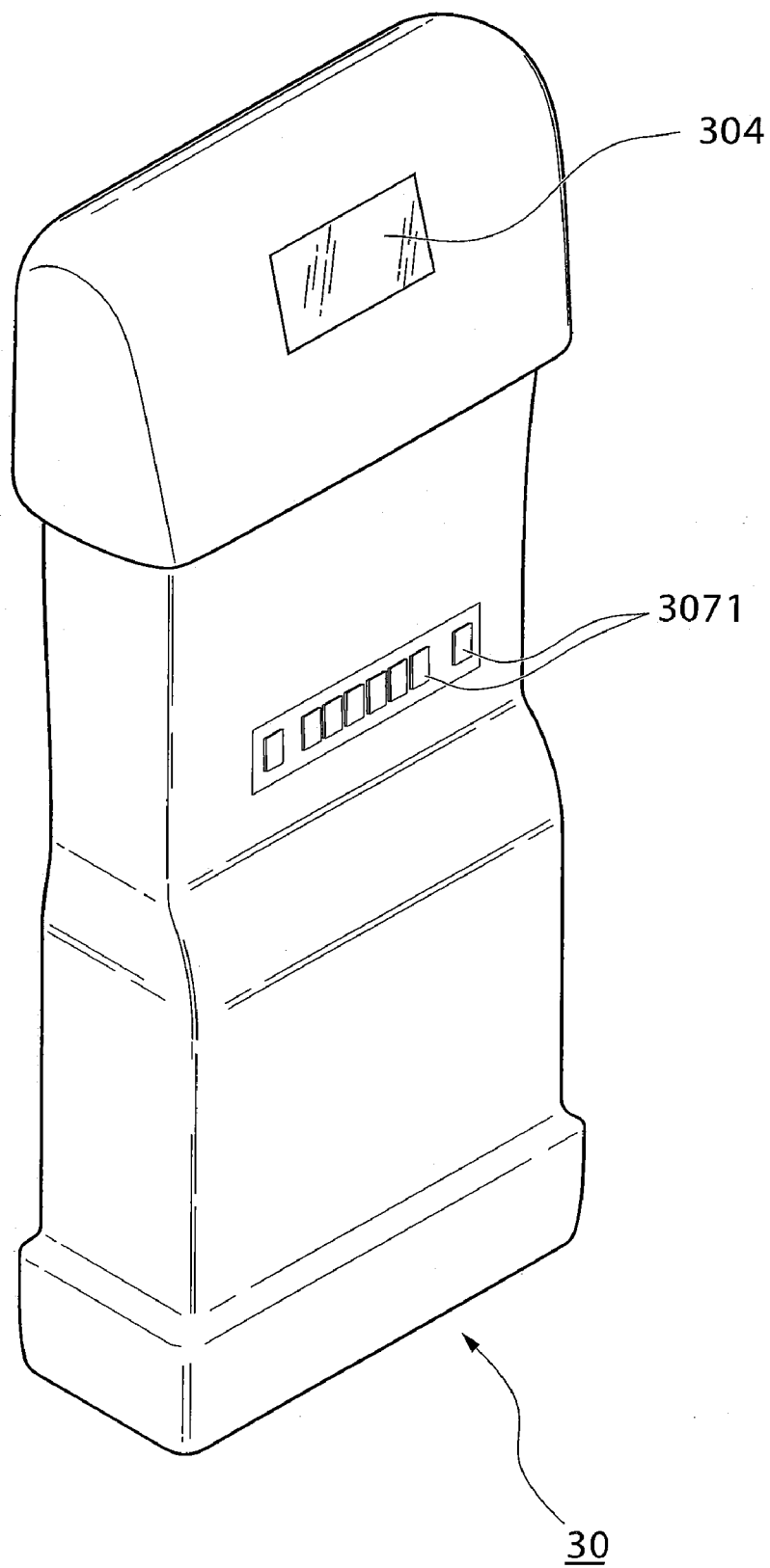
FIG. 4 is an exterior view of a rear side of the handy terminal shown in FIG. 2.

FIG. 2 is a block diagram showing the structure of a handy terminal 30, while FIG. 3 and FIG. 4 are external views of the front side and rear side respectively of the handy terminal 30. Note that a surface where a display section 305 is provided is on the front side, while the opposite surface thereof is provided on the rear side.

A CPU 301 (control section) is a central processing unit, and controls operations of the handy terminals 30 by reading and executing programs stored in ROM 302.

The ROM 302 is read only memory in which the above described programs are stored.

RAM 303 (storage section) is random access memory in which are stored product master files obtained by the store controller 10 via the customer cradle 40, and data of product barcodes read by a scanner section 304.

The scanner section 304 (code reading section) reads barcodes provided to products, and converts information of read barcodes into data of a predetermined format and then outputs this data. As is shown in FIG. 4, this scanner section 304 is provided in the surface on the rear side of the handy terminal 30, and a reading operation is performed when a barcode is placed close to the scanner section 304. Data that is output from the scanner section 304 when a barcode is read after this operation is performed by a customer is sent to the RAM 303 as data specifying the purchased products and is stored therein.

The display 305 (display section) displays the individual product names and prices of products whose barcodes have been read by the scanner section 304, lists of all read products and the total price thereof, the total number of purchases, and other types of messages (for example, display guidance on how to use a handy terminal 30 for customers who are unfamiliar with it). In addition, an LED light emitting unit 305a is provided in a center portion on the upper side of the display section 305. When it is turned on, this LED light emitting unit 305a indicates to a customer which one of a plurality of handy terminals 30 that are located on the customer cradle 40 the customer should use. Control is performed such that, upon receiving membership number data from the above described member card reader 50, the LED light emitting unit 305a is turned on.

Furthermore, the display 305 (display section) also displays price zones. FIG. 16 shows an example of how price zones are displayed. The example shown in the drawing has four price zones of 1000 yen or more, 500 yen or more, 300 yen or more, and 100 yen or more. It is shown that three products in the price zone of 300 yen or more and one product in the price zone of 100 yen or more are read. Note that the areas for the price zones displayed on the display 305 may be denoted by a notation system using symbols such as A, B, C, and D, instead of using phrases such as "1000 yen or more", "500 yen or more", "300 yen or more", and "100 yen or more." Such an example (not shown) has four price zones of A, B, C, and D. It is shown that three products in the price zone of C and one product in the price zone of D are read. As is seen from the price zone file shown in FIG. 15, the symbols of A, B, C, and D indicates the price zones of 1000 yen or more, 500 yen or more, 300 yen or more, and 100 yen or more, respectively.

For example, if only the store clerks use the display, of the price zones and it is not desirable for customers to know their meaning, it is possible to display them in the notation with symbols. If it is desirable to make customers aware that the store clerks use price zone notification to check purchased products, it is possible to display the price zone display areas in the notation with phrases. In addition, an LED light emitting unit 305a is provided in a center portion on the upper side of the display 305. When it is turned on, this LED light emitting unit 305a indicates to a customer which one of a plurality of hand terminals 30 that are located on the customer cradle 40 the customer should use. Control is performed such that, upon receiving membership number data from the above described member card reader 50, the LED light emitting unit 305a is turned on.

An operating section 306 is formed by a variety of keys which operate the handy terminal 30 and, as is shown in FIG. 3, has a scan key 3061 that is used to commence the reading of a barcode, a modification key 3062 that is used to delete or alter quantities of each product whose barcode has been read, a delete key 3063 that is used to delete all read products, a + (plus) key 3064 and a − (minus) key 3065 that are used to specify the quantity of a purchased product, up and down arrow keys 3066 that are used to move up and down a cursor that selects products on a displayed list of all read products, and an enter key 3067 that is used to enter an input operation.

A communication section 307 controls data communication between the cash register cradles 21 and the customer cradle 40. Specifically, when a handy terminal 30 is connected to a cash register cradle 21, data on purchased products (i.e., data read from the barcodes of the products by the scanner section 304) which is stored in the RAM 303 is sent to a POS cash register 20 via the cash register cradle 21, and when the handy terminal 30 is connected to the customer cradle 40, the latest product master files and membership number data which are transmitted from the store controller 10 are received. Note that this data communication is carried out in accordance with the communication protocol of the RS-232C as is described above.

Here, as is shown in FIG. 4, electrical connections between a handy terminal 30 and the cash register cradle 21 and customer cradle 40 are established using connection terminals 3071 which are provided on the surface on the rear side of each handy terminal 30. Moreover, in addition to the above described data communication, these connection terminals 3071 are also used for charging a rechargeable battery 310 when the handy terminal 30 is connected to the customer cradle 40.

A buzzer 308 generates a buzzer sound when, of the plurality of handy terminals 30 standing on the customer cradle 40, a handy terminal 30 whose LED light emitting unit 305a is turned off is removed from the customer cradle 40.

A power supply control section 309 controls the charging of the rechargeable battery 310 using power supplied from the customer cradle 40 while the handy terminal 30 is connected to the customer cradle 40.

The rechargeable battery 310 supplies power that is used to operate each section of a handy terminal 30.

Figure 5:
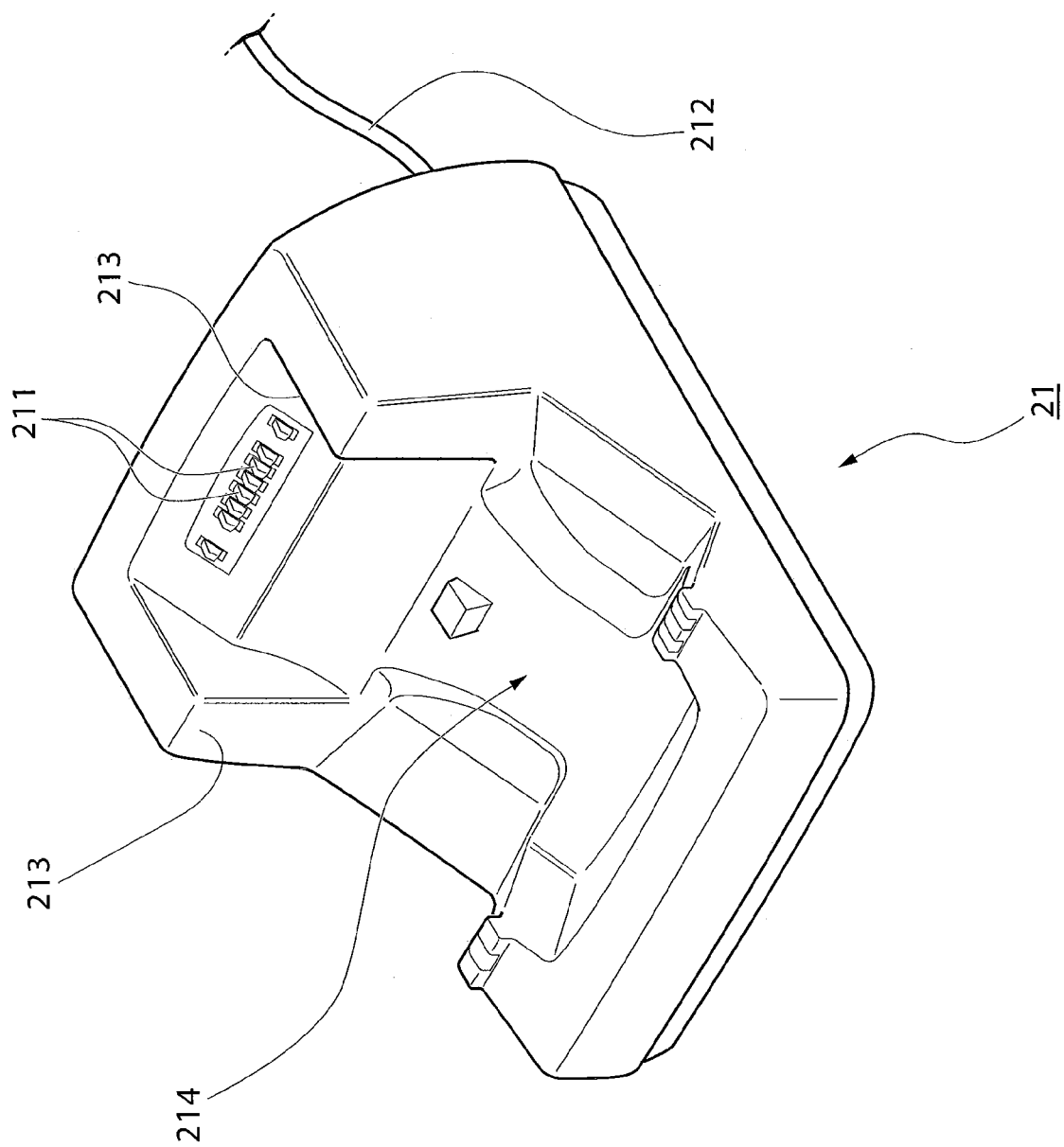
FIG. 5 is an exterior view of a cash register cradle in the product sales processing system shown in FIG. 1.

FIG. 5 shows an exterior view of a cash register cradle 21. Connection terminals 211 that are connected to the connection terminals 3071 of a handy terminal 30 are provided on a top surface (i.e., a portion on the right side in FIG. 5) of the cash register cradle 21. When the connection terminals 3071 of a handy terminal 30 are connected to these connection terminals 211, the handy terminal 30 becomes electrically connected to the POS cash register 20 via, in the following sequence, the cash register cradle 21, a connection cable 212 of the catch register cradle 21, and the connector 20a of the POS cash register 20, and the handy terminal 30 is placed in a state in which it is able to perform data communication with the POS cash register 20.

The cash register cradle 21 is formed having protruding portions 213 on both the left and right sides of the connection terminals 211, and is also formed such that an area located perpendicularly to the protruding portions 213 has a recessed portion 214. A handy terminal 30 is set in the cash register cradle 21 when it is held by these protruding portions 213 and recessed portion 214. Namely, when a handy terminal 30 is placed in the cash register cradle 21, the protruding portions 213 and the recessed portion 214 function as guide portions to guide the handy terminal 30 into a predetermined position, so that the connection terminals 3071 of the handy terminal 30 make contact properly with the connection terminals 211 of the cash register cradle 21, thereby creating an electrical connection.

Note that, as is shown in FIG. 5, a power supply lamp, a communication lamp (showing that a set handy terminal 30 and the POS terminal 20 are in communication), and an error lamp (showing that a communication error has occurred) and the like are provided on a lower side surface of the cash register cradle 21.

Figure 6:
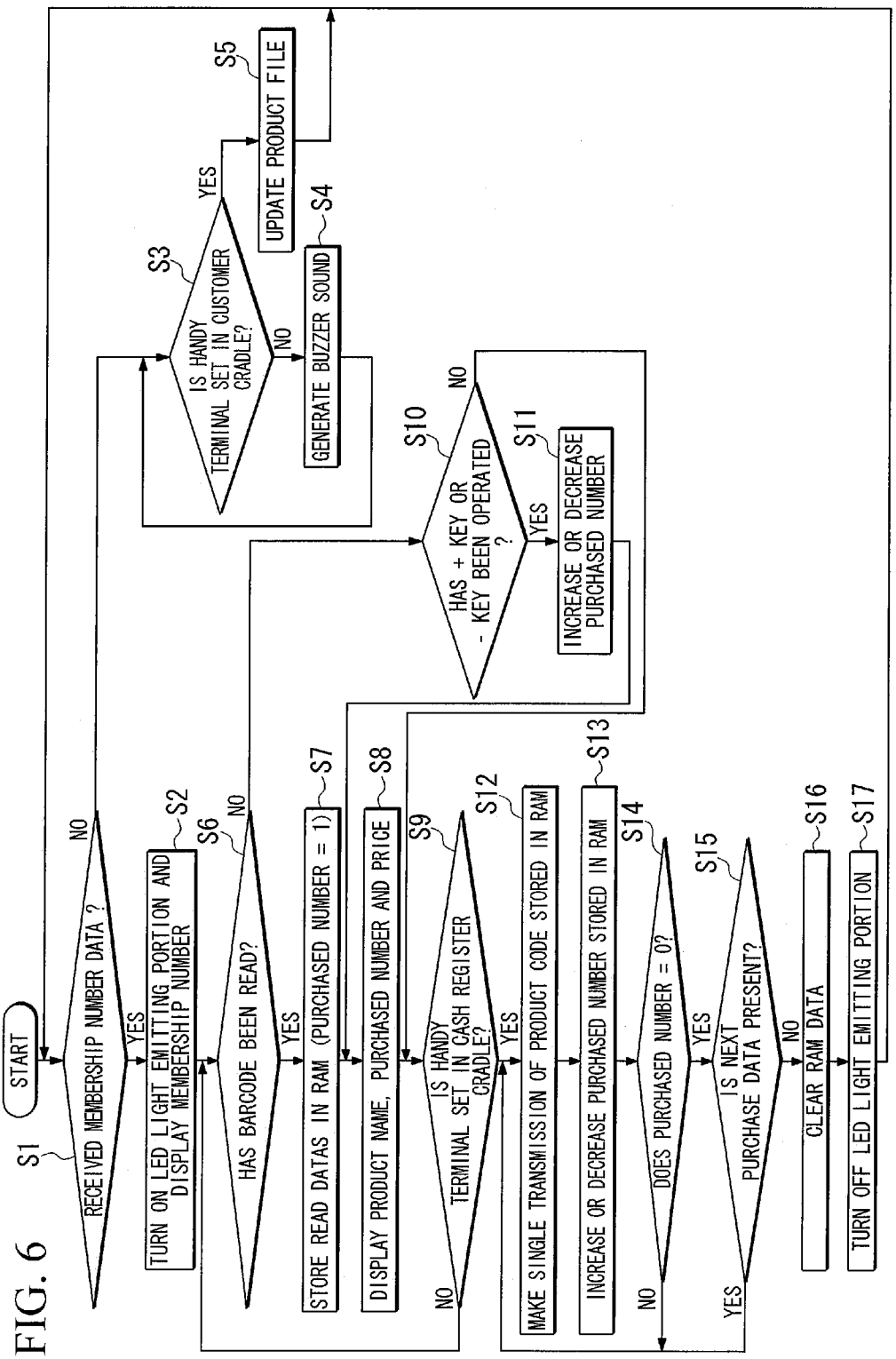
FIG. 6 is a flow chart illustrating an operation of the handy terminal shown in FIG. 2, according to a first embodiment.

Next, as a first embodiment, the operation (i.e., the processing of the CPU 301) of a handy terminal 30 in the present product sales processing system will be described in accordance with the flow chart shown in FIG. 6.

In step S1, the CPU 301 checks whether or not the membership number data sent from the member card reader 50 has been received by the communication section 307. As is described above, provided that the relevant handy terminal 30 is the earliest one to have been set in the customer cradle 40, then the membership number data will have been received thereby.

When it has been determined that the membership number data has been received, in step S2, the CPU 301 indicates the handy terminal 30 to be used by a customer by turning on the LED light emitting unit 305a thereof. In addition to this, in accordance with the received membership number data, the membership number is displayed on the display section 305. The customer then removes the handy terminal 30 whose LED light emitting unit 305a has been turned on from among the plurality of handy terminals 30 set in the customer cradle 40, and starts shopping. Note that, at this time, the CPU of the customer cradle 40 detects that the handy terminal 30 whose LED light emitting unit 305a is turned on has been removed and sets the handy terminal 30 to which the membership number data is to be transmitted next in accordance with the sequence in which the handy terminals 30 have been set in the customer cradle 40.

If, however, membership number data has not been received, in step S3, the CPU 301 checks whether or not the relevant handy terminal 30 is set in the customer cradle 40. This may be determined, for example, by checking whether or not the connection terminals 3071 are in a connected state. If it is determined that the relevant handy terminal 30 is not set in the customer cradle 40, in step S4, the CPU 301 gives notification that the customer was about to use (i.e. had removed) the wrong handy terminal 30 by generating a buzzer noise from the buzzer 308. At this time, if the handy terminal 30 making the buzzer noise is returned to the customer cradle 40, the determination in step S3 changes to YES, and the buzzer noise is stopped.

If the handy terminal 30 is set in the customer cradle 40 in the above described step S3, in step S5, the CPU 301 transmits an update date and time for the product master files stored in the RAM 303 from the communication section 307 to the customer cradle 40. Upon receiving this, the CPU of the customer cradle 40 checks whether or not these product master files are the most recent product master files, and transmits the most recent product master files to the handy terminal 30. The handy terminal 30 receives these most recent product master files, and stores them in the RAM 303.

When the handy terminal 30 is removed from the customer cradle 40 in step S2, in step S6, the CPU 301 checks whether or not a product bar code has been read by the scanner section 304. When a customer performs a barcode reading operation, the determination in step S6 changes to YES, and in step S7, the CPU 301 stores the product code in the RAM 303 based on the relevant read barcode. Moreover, at this time, the number purchased of the relevant product is stored in the RAM 303 as "1". Furthermore, the product name and price corresponding to this code are accessed from the product master files stored in the RAM 303.

Next, in step S8, the CPU 301 displays the product name, the number purchased, the price, and the total cost for the products currently being processed on the display section 305.

Next, in step S9, the CPU 301 checks whether or not the handy terminal 30 is connected to the cash register cradle 21. In the same way as in the above described step S3, this is determined by checking whether or not the connection terminals 3071 are in a connected state. If it is determined that the handy terminal 30 is not set in the cash register cradle 21, the routine returns to step S6 and the CPU 301 again checks whether or not a barcode has been read.

Here, if a reading operation has not been performed by a customer, the determination in the above described step S6 changes to NO, and in step S10, the CPU 301 checks whether or not the + key 3064 or the − key 3065 of the operating section 306 has been operated. If it is determined that one of these keys has been operated, in step S11, the CPU 301 increases or decreases the purchased number of the relevant product in accordance with the input operation, and stores the increased or decreased purchased number in the RAM 303.

For example, if the + key 3064 has been operated twice, the purchased number is updated to "3" and this is stored in the RAM 303. The routine then proceeds to step S8, and the value of the purchased number displayed on the display section 305 is altered to the updated value which is then displayed.

If the custom has finished the reading of the products the customer wishes to buy, and has carried the handy terminal 30 to a POS cash register 20 and has set the handy terminal 30 in the cash register cradle 21, then the determination in step S9 changes to YES. As a result, in step S12, the CPU 301 makes a single transmission of the product code stored in the RAM 303 in step S7 using the communication section 307. Ibis data is transmitted to the POS cash register 20 via the cash register cradle 21. Note that, as is described above, the data communication here is performed using the same communication protocol (here, this is an RS-232C) that was used by the barcode scanner incorporated in the POS cash register 20 prior to the introduction of the handy terminals 30 and the like. Accordingly, it is possible for the POS cash register 20 to receive a code from the barcode scanner 30 without any specifications on the POS cash register 20 side having to be modified.

When a single transmission of the product code is made in step S12, in step S13, the CPU 301 decreases by one the purchased number of the relevant product which is stored in the RAM 303. In step S14, the CPU 301 checks whether or not the purchased number has changed to "0" after this subtraction. If it is determined that the purchased number after the subtraction has not changed to "0", the routine returns to step S12, and the same product code is transmitted by the communication section 307. The CPU 301 repeats this processing until the purchased number reaches "0". In this manner, when more than one of a particular product is being purchased, the relevant product code is transmitted individually from the handy terminal 30 to the POS cash register 20 the same number of times as the purchased number. Accordingly, data is received in the POS cash register 20 in the same format as was used when it was transmitted from the barcode scanner prior to the introduction of the handy terminals 30.

When, in the above described step S14, the purchased number reaches "0", in step S15, the CPU 301 checks whether or not the data for the next product is still present in the RAM 303. If it is determined that the data for the next product is present, then the processing from step S112 through step S14 is repeated in the same way for this product.

If it is determined that the data for the next product is not present in the RAM 303, then this means that all the product data has been transmitted from the handy terminal 30 to the POS cash register 20. As a result, in step S16, the CPU 301 clears the read product data from inside the RAM 303.

Thereafter, payment processing is performed in the POS cash register 20. When this processing has ended, the store clerk removes the handy terminal 30 from the cash register cradle 21, and sets it again in the customer cradle 40 so that the next customer to the store is able to use it. In step S17, the CPU 301 detects from the connection state of the connection terminals 3071 that the handy terminal 30 has been removed from the cash register cradle 21 and has been set again in the customer cradle 40, and turns off the LED light emitting unit 305a.

An embodiment has been described in detail above with reference made to the drawings. However, the specific structure is not limited to the above description and various design modifications and the like can be made insofar as they do not depart from the spirit or scope of the present disclosure.

For example, because a variety of communication protocols exist for use in POS cash registers, it is also possible to make the handy terminals 30 able to deal with the various communication protocols, and provide them with a function of altering the communication protocol in accordance with the type of POS cash register to which they are connected.

Moreover, it is also possible to provide a numeric key and use this numeric key in order to alter the purchased number of a product in the operating section 306 of the handy terminal 30. It is also possible to not use the operating section 306 and instead read a product barcode the same number of times as the number of this product to be purchased, and then store this number. Furthermore, when an operation to alter a purchase number is performed by the handy terminal 30, instead of storing this number, it is also possible to store the altered number of codes of the relevant product (for example, if the purchase number is two then two product codes of this product are stored). Moreover, if a CPU and memory are incorporated into the cash register 21, and purchase numbers are received from a handy terminal 30, then it is also possible to transmit a product code to a POS cash register 20 the same number of times as the purchase number.

Moreover, communication between a handy terminal 30 and a cash register cradle 21 is not limited to communication by cable, and it is also possible to use electromagnetic waves, optics, sound waves, and the like. However, it is preferable that this communication is close range communication so that interference with adjacent POS cash registers 20 and cash register cradles 21 is avoided. In such cases, communication data between a handy terminal 30 and a cash register cradle 21 is converted in the cash register cradle 21 into communication data suitable for the POS cash register 20.

Moreover, the structure of the guide portion of the cash register cradles 21 is not limited to that shown in FIG. 5, and it is also possible to form, for example, a hole type of structure into which a handy terminal 30 is inserted.

Instead of providing the buzzer 308 in the handy terminals 30, it is also possible to provide a mechanical locking structure in the customer cradle 40, and to only release the lock of the locking structure of the handy terminal 30 to which membership number data has been sent from the customer cradle 40.

Moreover, if the POS cash registers 20 are of a type which has a plurality of connectors 20a, then it is possible to connect an additional cash register cradle 21 to an open connector 20a without removing the conventional barcode scanner.

When data that alters prices under special conditions such as bundle files and bargain sale files are set in the POS cash registers 20, it is possible to provide bundling and bargain sales in the conventional manner even in a self scanning system.

Moreover, even if the customer cradle 40 is not provided with a function of communicating with the store controller 10 or is not connected to the member card reader 50, it can still be used in this product sales processing system. In this case, because it is not necessary for the store controller 10 to communicate with the customer cradle 40, it is not necessary to alter the software of the store controller 10 when a self scanning system is constructed by introducing the handy terminals 30 and the customer cradle 40.

This product sales processing system has the following features:

a. In the POS cash registers 20, because it is not necessary to perform an operation to read a product code from a product when a customer is paying for a purchase (the reading of a product code is performed when a customer takes a product from a product display shelf and places it in their shopping basket), the overall time taken to register and pay for a product is shortened.

b. Because it is possible to construct a self scanning system simply by introducing additions in the form of the handy terminals, the register cradles and the customer cradle into an existing system made up of POS cash registers and a store controller, the system introduction costs are low. Moreover, this product sales processing system can be applied even when the existing POS cash registers are produced by different makers.

Figure 10:
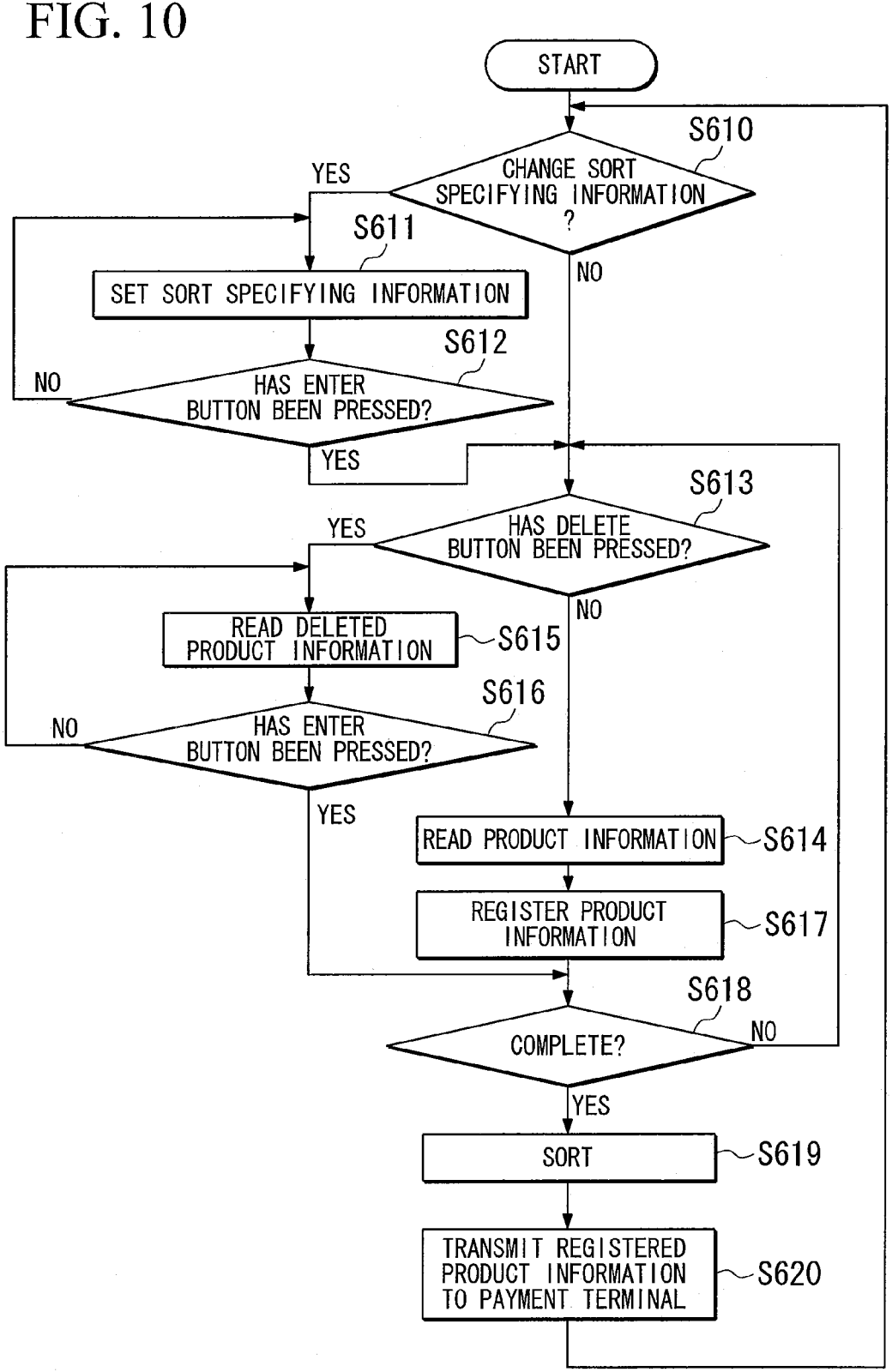
FIG. 10 is a flow chart illustrating an operation of the handy terminal shown in FIG. 2, according to a second embodiment.

Next, as a second embodiment, the operation (i.e., the processing of the CPU 301) of a handy terminal 30 in the present product sales processing system will be described in accordance with the flow chart shown in FIG. 10.

First, the CUP 301 determines whether or not the operating section 306 has received an operation for switching to a setting screen by which a screen displayed on the display 305 is switched to a setting screen for information specifying a sort order of the product information (step S610). For example, the CPU 301 determines that the operating section 306 has received an operation for switching to the setting screen when a predetermined operation for switching to the setting screen and a password for switching to the setting screen are input to the operating section 306. If it is determined that an operation for switching to the setting screen has been received, the routine proceeds to step S611. If, however, it is determined that it has not been received, the routine proceeds to step S613. In step S611, the CPU 301 displays on the display 305 items for specifying the sorting (the order of transmission) of the product information stored in the RAM 303. For example, items for specifying the sorting include keys for sorting (price, bargain sale classification, focused product classification) and a sort order (ascending order or descending order) key. Moreover, the operating section 306 receives inputs of the items specifying the sorting. The routine then proceeds to step S612. Note that, in the default state, the items for specifying the sorting of product information are set in descending order of price.

In step S612, the CPU 301 determines whether or not the operating section 306 has received an enter input. If it is determined that an enter input has been received, the items specifying the sorting that were input in step S611 is stored in the RAM, and then the routine proceeds to step S613. If, however, it is determined that an enter input has not been received, the routine returns to step S611. In step S613, the CPU 301 determines whether or not the operating section 306 or the display 305 has received a delete input. If it is determined that a delete input has been received, the CPU 301 displays a delete screen on the display 305, and then moves the routine to step S615. If it is determined that a delete input has not been received, the routine proceeds to step S614. In step S614, the scanner section 304 reads the barcodes (JAN codes) of the products to be purchased, and the routine then proceeds to step S617.

In step S617, the CPU 301 reads product information linked to the barcodes (JAN codes) that were read in step S614 from the product master file stored in the RAM 303, displays it on the display 305, add the date to the registered product master file for registration, and moves the routine to step S618. More specifically, product information, i.e., information on products that have been read by the scanner section 304 (product sales information) is recorded in the registered product master file. For example, if a read barcode is AAA, there is displayed "GRILLED MEAT BOX LUNCH 550x1" on the display 305.

In step S615, the scanner section 304 reads the barcode of the product to be deleted. Subsequently, the CPU 301 searches whether or not the product to which the read barcode is provided is registered in the registered product master file. If it is registered, the CPU 301 adds − (minus) to its price, changes the data classification to 1, register the product to which the read barcode is provided with the registered product master file, and moves the routine to step S616. If it is not registered, the CPU 301 notifies an error and moves the routine to step S616. For example, as a way to notify an error, the CPU 301 displays "NO RELEVANT DATA" on the display 305 and makes a buzzer noise of the buzzer 308. In step S616, the CPU 301 determines whether or not the operating section 306 has received an entry input.

If it is determined that an entry input has been received, the routine proceeds to step S618. If it is determined that an entry input has not been received, the routine returns to step S615.

In step S618, the CPU 301 determines whether or not the handy terminal 30 is connected to the cash register cradle 21. If it is determined that it is connected, the routine proceeds to step S619. If it is determined that it is not connected, the routine returns to step S613. For example, because a customer passes the handy terminal 30 in use to a store clerk when the shopping is over and the store clerk who has received the hand) terminal connects it to a cash register cradle 21, it is possible to determine that the shopping is over if the handy terminal 30 is connected to the cash register cradle 21. In step S619, based on the price (in descending order) that is set in advance as sorting information or on the items specifying the sorting that were input in step S611 and were determined in step S612, and on a sort order (ascending order or descending order), the CPU 301 sorts the product information of the registered product master file stored in the RAM 303 (product sales information), and moves the routine to step S620. FIG. 11 shows an example of a registered file after its product information is sorted in descending order of price. The items are the same as those of the registered products, and the product information is registered from above in an order from the highest price (the most important product). In step S620, the information of the sorted registered product master file is transmitted to the POS cash register 20 (payment terminal) via the communication section 307 in an order by important product. After completion of this transmission, the routine returns to step S610.

As described above, according to the present embodiment, when the product sales processing system (i.e., a self scanning system) is used, data of the purchased products read in the portable terminal is sorted in descending order of price (in an order from the most important product) and is transmitted to the POS cash register in an order from the most important product, thereby allowing the data to be displayed on the display section in an order from the most important product. Consequently, it becomes easier to find important products from the list displayed on the display section on the POS cash register. Namely, it is possible for a store clerk to easily check important products when checking whether or not the product sales data that a customer read matches up with the actually purchased products. In addition, even when a matching check is made between the registered products and the purchased products by checking the determined number of the products from the top in the displayed list, this check is made in an order from the most important product according to the present embodiment, expectedly leading to decrease in monetary loss on the store side or the customer side.

In step S618, a customer passes the handy terminal 30 in use to a store clerk when the shopping is over and the store clerk who has received the handy terminal connects it to a cash register cradle 21. After the handy terminal 30 is connected to the cash register cradle 21, the CPU 301 checks to see that the communication section 307 can communicate to determine the end of shopping. However, the CPU 301 may determine the end of shopping by displaying a finish key on the display 305 and receiving a select input and enter input of the finish key. In this case, the status of transmission start is maintained to keep on waiting until the communication section 307 of the handy terminal 30 becomes able to communicate. When the handy terminal 30 is connected to the cash register cradle 21, it is possible for the CPU 301 to check to see that the communication section 307 can communicate and then to start communication. If the operating section 306 receives a cancel input when the status of transmission start is maintained to keep on waiting until the communication section 307 of the handy terminal 30 becomes able to communicate, the routine is made to go back to step S613 where the customer is able to continue shopping.

Moreover, as an example of an operation for switching to a setting screen by which a screen displayed on the display 305 is switched to a setting screen for information specifying a sort order of the product information, in step S610, it was shown that a predetermined operation for switching to the setting screen and a password for switching to the setting screen are input to the operating section 306. However, it is possible to provide a switch button on the operating section 309 and to receive an input from the switch button. In addition, when the customer deletes the product information read by the handy terminal 30, delete processing is performed after the screen is switched to the delete screen in step S613. However, instead of the processing of step S613, it is possible to provide a delete button on the operating section 306, to perform the processing in step S615 after receiving an input from the delete button, and to move the routine to the processing of step S617 without performing the processing of step S616. In addition, normally, the scanner section 304 reads barcodes. However, if, for example, the scanner section cannot read a barcode, it is possible to adopt an emergent use of a method in which the operating section 306 receives a numerical value that corresponds to the barcode. Furthermore, it is possible to provide a sort key on the handy terminal 30 so that a selection can be made whether or not to perform sorting in step S619.

Next, as a third embodiment, a structure of a POS cash register 20 (payment terminal) in the present product sales processing system will be described with reference made to FIG. 12. An operation thereof will be described in accordance with the flow chart shown in FIG. 13. Note that, in the present embodiment, it is not necessary for the handy terminal 30 to have a sorting function because sorting of the registered products of the registered product master file is performed in the POS cash register.

Figure 12:
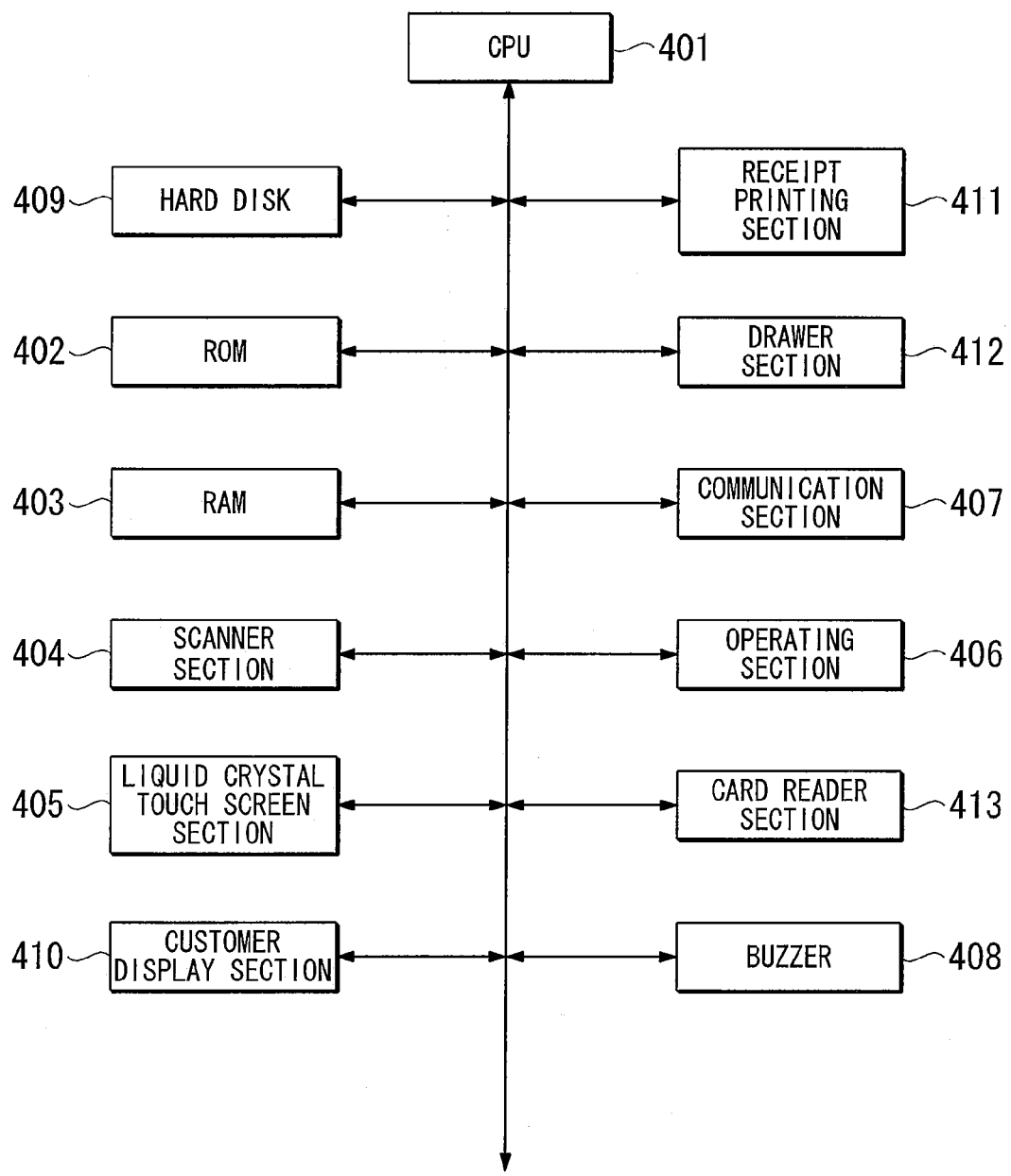
FIG. 12 is a block diagram showing the structure of a POS cash register in the product sales processing system shown in FIG. 1, according to a third embodiment.

FIG. 12 is a block diagram showing the structure of a POS cash register 20 of the present embodiment. A CPU 401 (control section) is a central processing unit, and controls operations of the POS cash register 20 by reading and executing programs stored in ROM 402. The ROM 402 is read only memory in which the above described programs are stored. RAM 403 (storage device) is random access memory in which are stored a product master file obtained by the store controller 10, registered products obtained by a handy terminal 30, and the like.

A scanner section 404 (code reading section) reads barcodes provided to products, and converts information of read barcodes into data of a predetermined format and then outputs this data. A reading operation is performed when a barcode is placed close to the scanner section 404. Data that is output from the scanner section 404 when a barcode is read is sent to the RAM 403 as data specifying the purchased products and is stored therein.

A liquid crystal touch screen section 405 (display section) displays information to be notified to a store clerk such as a registered product master file. It receives an input in addition to performing a display because it is of touch screen type.

An operating section 406 is formed by a variety of keys which operate the POS cash register 20. A communication section 407 communicates with the handy terminal 30 via the store controller and the cash register cradle 21 through a LAN 60. A buzzer 408 generates a buzzer sound when, for example, confirmation of operation is necessary. A hard disk 409 stores the information that is stored in the RAM 403 after completion of the checkout processing. A customer display section 410 displays information to be notified to a customer such as prices of products, total cost, and change. A receipt printing section 411 prints a receipt. A drawer section 412 stores cash, cash vouchers, and the like. A card reader section 413 reads information of a credit card for the checkout processing if a customer wishes to make payment with a credit card.

Figure 13:
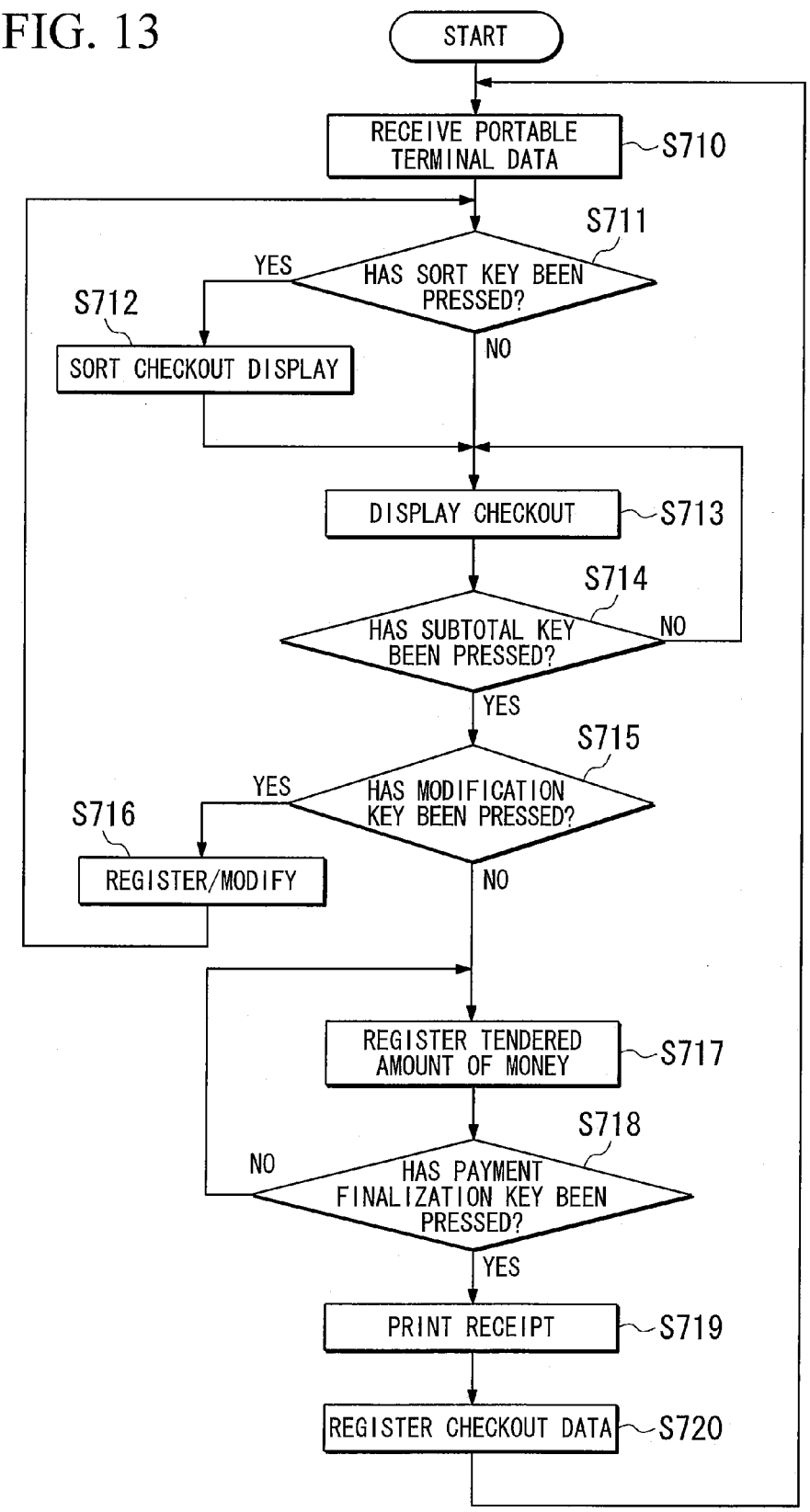
FIG. 13 is a flow chart illustrating an operation of the POS cash register shown in FIG. 12.

Next, an operation of a POS cash register 20 (payment terminal) in the present product sales processing system will be described in accordance with the flow chart shown in FIG. 13. First, in step S710, the CPU 401 receives a registered product master file from the handy terminal 30, and moves the routine to step S711. Specifically, when the handy terminal 30 is connected to the cash register cradle 21 that is connected to a POS cash register 20, the registered product master file stored in the RAM 303 of the handy terminal 30 is automatically moved to the RAM 403 of the POS cash register 20. At this time, the order of the registered products are the same as that stored in the RAM 303 of the handy terminal 30.

In step S711, the CUP 401 determines whether or not the liquid crystal touch screen section 405 or the operating section 406 has received a sorting operation specifying the display order of the product information of the registered product master file. If it is determined that a sorting operation has been received, the routine proceeds to step S712. If it is determined that a sorting operation has not been received, the routine proceeds to step S713. In step S712, the liquid crystal touch screen section 405 displays, as items specifying the sorting order (the display order), keys specifying a sorting order such as "price", "product to be mainly checked", and "bargain sale product", and a sort order (ascending order or descending order) key, and receives an input from each displayed key. Subsequently, the CPU 401 sorts the product information of the registered product master file that is stored in the RAM 403 based on the items specifying a sort order that is received by the liquid crystal touch screen section 405. The routine then proceeds to step S713.

In step S713, the liquid crystal touch screen section 405 displays the product information of the registered product master file stored in the RAM 403 in the same order as is stored, and then routine proceeds to step S714. Note that, at this time, the store clerk visually checks whether or not the product information displayed on the liquid crystal touch screen section 405 matches up with the products in the shopping basket. In step S714, the CPU 401 determines whether or not the operating section 406 has received an operation of a subtotal key. If it is determined that an operation of the subtotal key has been received, the CPU 401 calculates the total amount of the purchased price for the customer based on the registered product master file stored in the RAM 403, displays the total cost on the customer displace section 430 and the liquid crystal touch screen section 405, and moves the routine to step S715. If it is determined that an operation of the subtotal key has not been received, the routine returns to S713.

In step S715, the CPU 401 determines whether or not the operating section 406 has received an operation of a modification keys. If it is determined that an operation of the modification key has been received, the routine proceeds to step S716. If it is determined that an operation of the modification key has not been received, the routine proceeds to step S717. In step S716, the scanner section 404 reads the barcode of the product to be deleted. Subsequently, the CPU 301 searches whether or not the product to which the read barcode is provided is registered in the registered product master file. If it is registered, the CPU 301 adds – (minus) to its price, changes the data classification to 1, register the product to which the read barcode is provided with the registered product master file, and moves the routine back to step S711. If it is not registered, the CPU 301 notifies an error and moves the routine back to step S711. For example, as a way to notify an error, the liquid crystal touch screen section 405 displays "NO RELEVANT DATA" and the buzzer 408 makes a buzzer noise. If it is determined that the operating section 406 has received an additional key operation after it received an input of the modification key, the CPU 401 additionally registers the product provided with a barcode that the scanner section 404 has read, and moves the routine back to step S711. In step S717, the store clerk inputs information in accordance with the amount of money tendered by the customer, to the POS cash register 20 via the operating section 406. The CPU 401 stores the input amount of money in the RAM 403, displays the amount of money on the customer display section 430 and the liquid crystal touch screen section 405, and moves the routine to step S718.

Figure 14:
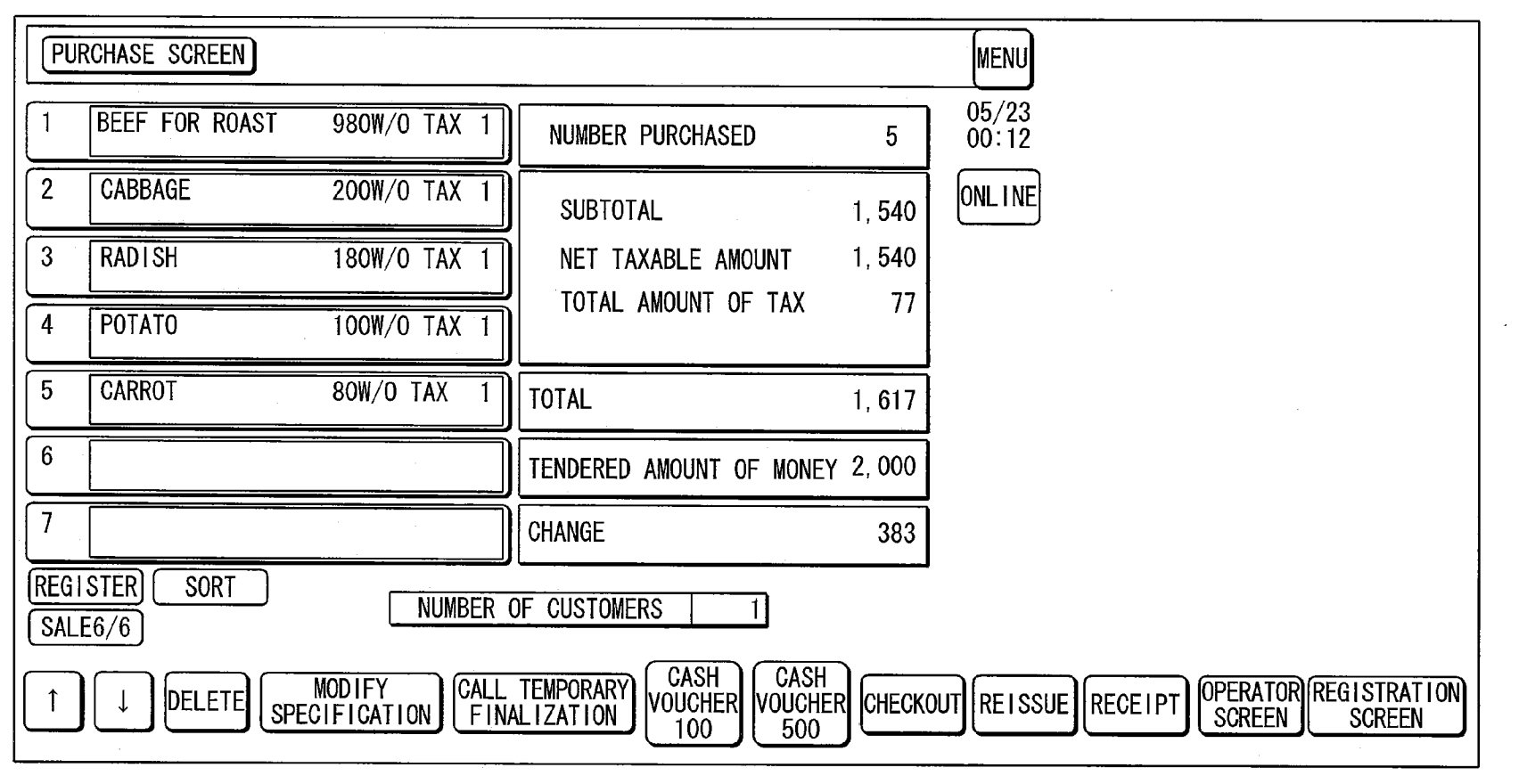

In step S718, the CPU 401 determines whether or not the operating section 406 has received an operation of a payment finalization key. If it is determined that an operation of the payment finalization key has not been received, the routine returns to step S717. If it is determined that an operation of the payment finalization key has been received, the CPU 401 calculates an amount of change due based on the tendered amount of money that was input in step S107 and on the total amount of the prices of the products registered in the registered product master file, stores the amount of change in the RAM 403, displays the amount of change on the customer display section 430 and the liquid crystal touch screen section 405, and moves the routine to step S719. FIG. 14 shows a display example of the product information that the liquid crystal touch screen section 405 displays when it is determined that a sorting operation has been received in step S711. The display items include product name, price, number, number purchased, subtotal, net taxable amount, total amount of tax, sum total, tendered amount of money, and change. The example of the product information of the example shown is in the order of: beef for roast 980) yen; cabbage 200 yen; radish 180 yen; potato 100 yen; and carrot 80 yen, which are sorted in order of price.

In step S719, the receipt printing section 440 issues a receipt based on the registered product master file. The routine then proceeds to step S720. In step S720, the CPU 401 moves what the RAM 403 stores to the hard disk 410, and moves the routine back to step S710.

As described above, according to the present embodiment, when the product sales processing system (i.e., a self scanning system) is used, product information read from the portable terminal to the POS cash register is sorted in descending order of price in the POS cash register. Therefore, the product information is displayed on the POS cash register in an order from the most expensive product (the most important product). Consequently, it becomes easier to find important products from the list displayed on the POS cash register. Namely, it is possible for a store clerk to easily check important products when checking whether or not the product sales data that a customer read matches up with the actually purchased products. Even when a matching check is made between the registered products and the purchased products by checking the determined number of the products from the top in the displayed list, this check is made in an order from the most important product according to the present embodiment, expectedly leading to decrease in monetary loss on the store side or the customer side. Note that there is a possibility that some customers will not want the product information to be printed on the receipt in order of price. Therefore, even when the product information is sorted in the POS cash register, it is possible to print on the receipt the product information in the order before sorting.

Embodiments of the present invention have been described in detail above with reference made to the drawings, however, the specific structure of this invention is not limited to the above description and various design modifications and the like can be made insofar as they do not depart from the spirit or scope of this invention. For example, the setting for information that specifies sorting of the product information is changeable. However, it is possible for the setting for the information to be fixed to one that is expectedly used most frequently. For example, it is possible for the setting for information that specifies sorting of the product information to be fixed to one in decreasing order of price. In addition, it is possible to previously specify information for classification such as bargain sale classification and important products classification, which is defined in the product master file previously stored in the RAM of the handy terminal. Then, if the product read by the scanner section is included in the previously specified group, it is possible to notify the store clerk of that fact by using a notification method of displaying a message on the display section or flashing the product name displayed on the display section. Moreover, instead of sorting all the products, it is possible to sort only products classified as maximum importance in the focused product classification. Moreover, it is possible to sort any number of the products from the top in descending order by important product. For example, it is possible to sort only top 10 products. In this case, the product purchase information stored in the storage section of the portable terminal is in the order in which the customer read the codes. Therefore, it is possible to sort the information in descending order by important product when it is transmitted to the POS cash register.

Figure 17:
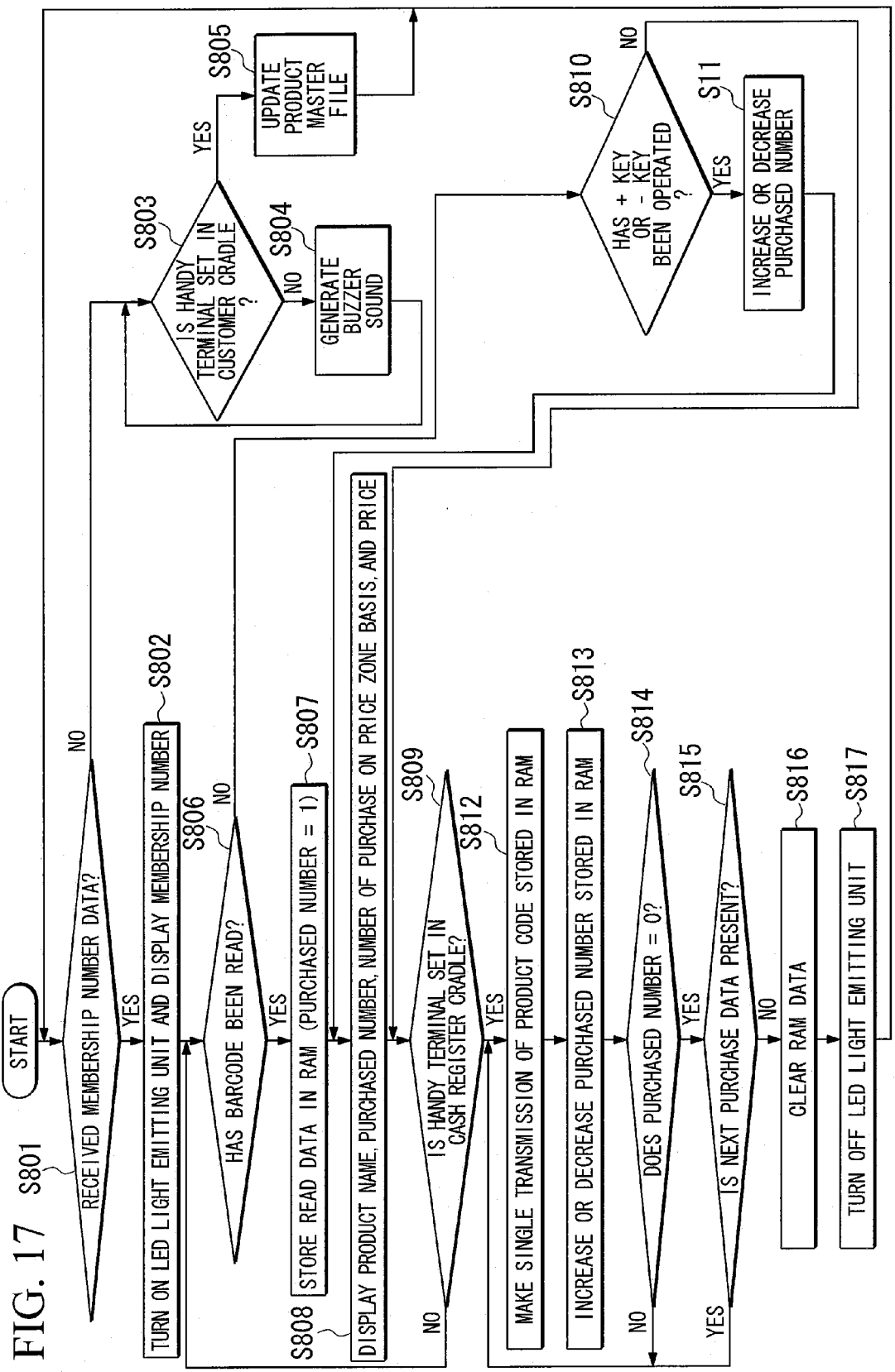
FIG. 17 is a flow chart illustrating an operation of the handy terminal shown in FIG. 2, according to a fourth embodiment.

Next, as a fourth embodiment, the operation (i.e., the processing of the CPU 301) of a handy terminal 30 in the present product sales processing system will be described in accordance with the flow chart shown in FIG. 17.

In step S801, the CPU 301 checks whether or not the membership number data sent from the member card reader 50 has been received by the communication section 307. As is described above, provided that the relevant handy terminal 30 is the earliest one to have been set in the customer cradle 40, then the membership number data will have been received thereby.

When it has been determined that the membership number data has been received, in step S802, the CPU 301 indicates the handy terminal 30 to be used by a customer by turning on the LED light emitting unit 305a thereof. In addition to this, in accordance with the received membership number data, the membership number is displayed on the display 305. The customer then removes the handy terminal 30 whose LED light emitting unit 305a has been turned on from among the plurality of handy terminals 30 set in the customer cradle 40, and starts shopping. Note that, at this time, the CPU of the customer cradle 40 detects that the handy terminal 30 whose LED light emitting unit 305a is turned on has been removed and sets the handy terminal 30 to which the membership number data is to be transmitted next in accordance with the sequence in which the handy terminals 30 have been set in the customer cradle 40.

If, however, membership number data has not been received, in step S803, the CPU 301 checks whether or not the relevant handy terminal 30 is set in the customer cradle 40. This may be determined, for example, by checking whether or not the connection terminals 3071 are in a connected state. If it is determined that the relevant handy terminal 30 is not set in the customer cradle 40, in step S804, the CPU 301 gives notification that the customer was about to use (i.e., had removed) the wrong handy terminal 30 by generating a buzzer noise from the buzzer 308.

At this time, if the handy terminal 30 making the buzzer noise is returned to the customer cradle 40, the determination in step S803 changes to YES, and the buzzer noise is stopped.

If the handy terminal 30 is set in the customer cradle 40 in the above described step S803, in step S805, the CPU 301 transmits an update date and time for the product master files stored in the RAM 303 from the communication section 307 to the customer cradle 40. Upon receiving this, the CPU of the customer cradle 40 checks whether or not these product master files are the most recent product master files, and transmits the most recent product master files to the handy terminal 30. The handy terminal 30 receives these most recent product master files, and stores them in the RAM 303.

When the handy terminal 30 is removed from the customer cradle 40 in step S802, in step S806, the CPU 301 checks whether or not a product barcode has been read by the scanner section 304. When a customer performs a barcode reading operation, the determination in step S806 changes to YES, and in step S807, the CPU 301 stores the product code in the RAM 303 based on the relevant read barcode. Moreover, at this time, the number purchased of the relevant product is stored in the RAM 303 as "1". Furthermore, the product name and price corresponding to this code are accessed from the product master files stored in the RAM 303. If a read code is not stored in the product master files, the entry for the relevant product name is made "unregistered product", and the entry for its price is left blank.

Next, in step S808, the CPU 301 displays price zones and product information including the product name, the number purchased, the price, and the total cost for the products currently being processed on the display 305. At the same time, the CPU 301 determines which price zone the products currently being processed belong to with reference to the product master files previously stored in the RAM 303. Subsequently, of the numbers displayed on the display 305, the CPU 301 adds the number of the products currently being processed to the number of the price zone to which the price of the products currently being processed, and displays the added number. For example, if the customer used the handy terminal 30 to read three products at the price of 320 yen, the CPU 301 refers to the product master files stored in the RAM 303 and determines that products at the price of 320 yen belong to the price zone C. Subsequently, the CPU 301 adds 3 to the number of the price zone C displayed on the display 305 of the handy terminal 30, and redisplays the number resulting from this addition. Similarly, if the customer used the handy terminal 30 to read one product at the price of 125 yen, the CPU 301 adds 1 to the number of the price zone D displayed on the display 305 of the handy terminal 30, and redisplays the number resulting from this addition. FIG. 18 shows an example of how the price zones and the product information are displayed on the display 305 in step S808. The example shown in the drawing illustrates that a total of four products are read and that the total cost is 1025 yen. It also illustrates the read product name, unit price, number, and subtotal. As for the egg, its unit price is 125 yen, its purchased number is 1, and its subtotal is 125 yen. As for the apple, its unit price is 300 yen, its purchased number is 3, and its subtotal is 900 yen. The price zone display area has four price zones of 1000 yen or more, 500 yen or more, 300 yen or more, and 100 yen or more, and shows that three products in the price zone of 300 yen or more and one product in the price zone of 100 yen or more are read.

As a price zone to which products provided with a code not included in the product master files (non-file products) belongs, a price zone of "non-file product" is included in the price zones of the price zone files previously stored in the RAM 303. If the read code is not stored in the product master files, it is possible for the CPU 301 to determine that the product currently being processed belongs to the price zone of non-file products.

Next, in step S809, the CPU 301 checks whether or not the handy terminal 30 is connected to the cash register cradle 21. In the same way as in the above described step S803, this is determined by checking whether or not the connection terminals 3071 are in a connected state. If it is determined that the handy terminal 30 is not set in the cash register cradle 21, the routine returns to step S806 and the CPU 301 again checks whether or not a barcode has been read.

Here, if a reading operation has not been performed by a customer, the determination in the above described step S806 changes to NO, and in step S810, the CPU 301 checks whether or not the + key 3064 or the − key 3065 of the operating section 306 has been operated. If it is determined that one of these keys has been operated, in step S811, the CPU 301 increases or decreases the purchased number of the relevant product in accordance with the input operation, and stores the increased or decreased purchased number in the RAM 303. At the same time, the CPU 301 adds the altered number to the number of the relevant price zone.

For example, if the + key 3064 has been operated twice, the purchased number is updated to "3" and this is stored in the RAM 303. The routine then proceeds to step S808, and the value of the purchased number displayed on the display 305 is altered to the updated value which is then displayed. In addition, the value of the price zone is also altered to a value added with "3" which is then displayed.

If the customer has finished the reading of the products the customer wishes to buy, and has carried the handy terminal 30 to a POS cash register 20 and has set the handy terminal 30 in the cash register cradle 21, then the determination in step S809 changes to YES. As a result, in step S812, the CPU 301 makes a single transmission of the product code stored in the RAM 303 in step S807 using the communication section 307. This data is transmitted to the POS cash register 20 via the cash register cradle 21. Note that, as is described above, the data communication here is performed using the same communication protocol (here, this is an RS-232C) that was used by the barcode scanner incorporated in the POS cash register 20 prior to the introduction of the handy terminals 30 and the like. Accordingly, it is possible for the POS cash register 20 to receive a code from the barcode scanner 30 without any specifications on the POS cash register 20 side having to be modified.

When a single transmission of the product code is made in step S812, in step S813, the CPU 301 decreases by one the purchased number of the relevant product which is stored in the RAM 303.

In step S814, the CPU 301 checks whether or not the purchased number has changed to "0" after this subtraction. If it is determined that the purchased number after the subtraction has not changed to "0", the routine returns to step S812, and the same product code is transmitted by the communication section 307. The CPU 301 repeats this processing until the purchased number reaches "0". In this manner, when more than one of a particular product is being purchased, the relevant product code is transmitted individually from the handy terminal 30 to the POS cash register 20 the same number of times as the purchased number. Accordingly, data is received in the POS cash register 20 in the same format as was used when it was transmitted from the barcode scanner prior to the introduction of the handy terminals 30.

When, in the above described step S814, the purchased number reaches "0", in step S815, the CPU 301 checks whether or not the data for the next product is still present in the RAM 303.

If it is determined that the data for the next product is present, then the processing from step S812 through step S814 is repeated in the same way for this product.

If it is determined that the data for the next product is not present in the RAM 303, then this means that all the product data has been transmitted from the handy terminal 30 to the POS cash register 20. As a result, in step S816, the CPU 301 clears the read product data from inside the RAM 303.

Thereafter, payment processing is performed in the POS cash register 20. When this processing has ended, the store clerk removes the handy terminal 30 from the cash register cradle 21, and sets it again in the customer cradle 40 so that the next customer to the store is able to use it. In step S817, the CPU 301 detects from the connection state of the connection terminals 3071 that the handy terminal 30 has been removed from the cash register cradle 21 and has been set again in the customer cradle 40, and turns off the LED light emitting unit 305a.

As described above, according to the present embodiment, when a product sales processing system (i.e., a self scanning system) is used, it is possible to easily check whether or not the product sales data read by a customer matches up with the actually purchased products. For example, in the method of comparing the number of the products read into the portable terminal with the number of the products in the basket to check whether or not they match up, it is not possible to determine whether or not product(s) different in price are included even though the two numbers match up.

However, in the present embodiment, the numbers are displayed on a price zone basis. As a result, it is possible to check not only an error in number but also an error in product price. Specifically, if one product in the high price zone is in the basket and the portable terminal displays "0" as the number of products in the high price zone when the number of the products read in the portable terminal matches up with the number of the products in the basket, it is found that the portable terminal was used to read a code of a product that is different from the high price product in the basket. Moreover, an expected effect is that actions will decrease such as using the portable terminal to intentionally read the code of a low price product and putting a high price product in the basket to make payment.

A second effect of the embodiment is as follows. Because not only display on a price zone basis but also the information on products whose codes are read is simultaneously displayed on the display section, it is made easier to compare which product is allocated to which price zone, and hence it is possible to easily check whether or not the product sales data read by a customer matches up with the actually purchased products.

A third effect of the embodiment is as follows. As a price zone to which products provided with a code not included in the product master files (non-file products) belongs, a price zone of "non-file product" is included in the price zones of the price zone files previously stored in the RAM 303. If the read code is not stored in the product master files, it is possible for the CPU 301 to determine that the product currently being processed belongs to the price zone of non-file products. As a result, it possible to see that a product whose price is not registered is included in the products read by the portable terminal.

An embodiment has been described in detail above with reference made to the drawings, however, the specific structure is not limited to the above description and various design modifications and the like can be made insofar as they do not depart from the spirit or scope.

For example, because a variety of communication protocols exist for use in POS cash registers, it is also possible to make the handy terminals 30 able to deal with the various communication protocols, and provide them with a function of altering the communication protocol in accordance with the type of POS cash register to which they are connected.

For example, it is possible to change, for example, the color of each price zone of the price zone notification, or enlarge the size of the font in the high price zone displayed on the display 305 of the handy terminal 30, to thereby give prominence to a price zone to be intensively checked.

Moreover, it is possible to transmit the data of the price zone notification displayed on the display 305 of the handy terminal 30 to the POS cash register 20 and display the similar notification to that displayed on the display 305 on the display section of the POS cash register 20.

Moreover, it is possible to display the price zone notification at the completion of all the reading, instead of updating the price zone notification every time a product is read.

Moreover, it is possible to perform a price zone notification on a classification basis.

Moreover, it is possible to display only some of the price zones instead of all the price zones. For example, it is possible to display only a high price zone that is intended to be intensively checked.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A self scanning system comprising:
a portable terminal operable by a user and configured to read and store codes of products;
a cash register configured to accept payments, said payments based on stored data in the portable terminal, wherein the cash register includes a connector capable of connecting to a scanner; and
a cash register cradle in which the portable terminal is set when performing payment, and that connects the portable terminal to the connector of the cash register enabling communication between the portable terminal and the cash register via the cash register cradle and the connector of the cash register,
the portable terminal comprising:
a code reading section that reads the codes that are provided to products;
a storage section that stores the codes which have been read by the code reading section; and
a communication section that, when the portable terminal is connected to the cash register cradle when the single user finishes shopping and makes a payment, transmits product purchase information which includes the codes stored in the storage section to the cash register via the cash register cradle, wherein
the storage section further stores previously-set product information which relates the codes with prices of the products, and previously-set price zone information, and the portable terminal further comprises:
- a control section that determines the price zones, to which the products provided with the codes which have been read by the code reading section belong, based on the codes which have been read by the code reading section and stored in the storage section, the product information, and the price zone information, and calculates numbers of the products which belong to the price zones for the individual price zones; and
- a display section that displays the numbers of the products which have been calculated by the control section for each price zone per user at the time of payment at the cash register.

2. The self scanning system according to claim 1, wherein the portable terminal comprises a number input device that inputs the number of each product whose code has been read by the code reading section, and
one of the portable terminal and the cash register cradle comprises a device that transmits the codes of products for which an input has been made via the number input device to the cash register the same number of times as the input was made.

3. The self scanning system according to claim 1, wherein the communication section transmits the product purchase information that is stored in the storage section in a descending order of prices, and
the cash register comprises:
- a receiving section that receives the product purchase information from the portable terminal; and
- a display section that displays the product purchase information in an order in which the product purchase information is received by the receiving section.

4. The self scanning system according to claim 1, wherein product purchase information is sent to the cash register from the communication section, and
the cash register comprises:
- a communication device that receives the product purchase information including the codes from the portable terminal;
- a storage device that stores the product purchase information received by the communication device; and
- a display section that displays the product purchase information stored in the storage device in a descending order of prices.

\* \* \* \* \*